US012299038B2

(12) United States Patent
Krishnan et al.

(10) Patent No.: US 12,299,038 B2
(45) Date of Patent: May 13, 2025

(54) INFRASTRUCTURE FOR COMPOSED SUPERGRAPHS

(71) Applicant: Apollo Graph, Inc., San Francisco, CA (US)

(72) Inventors: Ashi Krishnan, New York, NY (US); Martijn Walraven, Amsterdam (NL); Sylvain Lebresne, Rennes (FR); Jesse Rosenberger, Helsinki (FI); Phil Prasek, Seattle, WA (US)

( * ) Notice: Subject to any disclaimer, the term of this patent is extended or adjusted under 35 U.S.C. 154(b) by 85 days.

(21) Appl. No.: 17/977,849

(22) Filed: Oct. 31, 2022

(65) Prior Publication Data

US 2023/0138971 A1    May 4, 2023

Related U.S. Application Data

(60) Provisional application No. 63/274,890, filed on Nov. 2, 2021.

(51) Int. Cl.
| | | |
|---|---|---|
| G06F 16/00 | (2019.01) | |
| G06F 16/21 | (2019.01) | |
| G06F 16/901 | (2019.01) | |

(52) U.S. Cl.
CPC ........ G06F 16/9024 (2019.01); G06F 16/211 (2019.01)

(58) Field of Classification Search
CPC .................. G06F 16/9024; G06F 16/211
See application file for complete search history.

(56) References Cited

U.S. PATENT DOCUMENTS

| | | | |
|---|---|---|---|
| 10,949,178 B1* | 3/2021 | Russell | G06F 8/71 |
| 11,734,068 B1* | 8/2023 | Shah | G06F 9/52 |
| | | | 718/100 |
| 2002/0178401 A1* | 11/2002 | Ball | G06F 11/3608 |
| | | | 714/38.1 |
| 2003/0120681 A1* | 6/2003 | Baclawski | G06F 16/334 |
| 2006/0036564 A1* | 2/2006 | Yan | G06F 16/583 |
| | | | 707/E17.02 |
| 2009/0303237 A1* | 12/2009 | Liu | H04L 63/0414 |
| | | | 345/440 |
| 2018/0004751 A1 | 1/2018 | Vikhe et al. | |
| 2019/0310840 A1* | 10/2019 | Dufresne | G06N 5/00 |
| 2020/0380156 A1* | 12/2020 | Garg | G06F 21/64 |
| 2021/0248143 A1* | 8/2021 | Khillar | G06F 16/2379 |
| 2021/0294679 A1 | 9/2021 | Thakur et al. | |
| 2022/0058210 A1* | 2/2022 | Thakur | G06F 9/547 |
| 2022/0075825 A1 | 3/2022 | Helms et al. | |
| 2022/0342932 A1* | 10/2022 | Monk | G06F 16/28 |
| 2023/0004943 A1* | 1/2023 | Øhrn | G06Q 50/01 |

(Continued)

FOREIGN PATENT DOCUMENTS

WO    WO2024097671    5/2024

OTHER PUBLICATIONS

International Search Report and Written Opinion for PCT/US23/78219 mailed Mar. 22, 2024, 8 pages.

(Continued)

*Primary Examiner* — Leslie Wong
(74) *Attorney, Agent, or Firm* — Berkeley Law & Technology Group, LLP

(57) ABSTRACT

The present disclosure relates generally to Internet of Things (IoT)-type devices and, more particularly, to infrastructure for composed supergraphs.

12 Claims, 13 Drawing Sheets

(56) References Cited

U.S. PATENT DOCUMENTS

2023/0126509 A1* 4/2023 Zhang ................ G06F 16/2453
707/715
2023/0359667 A1* 11/2023 Zionts ................ G06F 16/9024

OTHER PUBLICATIONS

PCT/US23/78219 / : Chapter II Demand and Article 34 Amendment filed Aug. 30, 2024, 22 pages.
PCT/US23/78219 / : Response to Invitation to Correct Demand filed Oct. 10, 2024, 6 pages.
PCT/US2023/078219—International Preliminary Report on Patentability Chapter II mailed Feb. 26, 2025, 18 pages.

* cited by examiner

INFRASTRUCTURE FOR COMPOSED SUPERGRAPHS

BACKGROUND

Field

The present disclosure relates generally to Internet of Things (IoT)-type devices and, more particularly, to infrastructure for composed supergraphs.

Information

The Internet is widespread. The World Wide Web or simply the Web, provided by the Internet, is growing rapidly, at least in part, from the large amount of content being added seemingly on a daily basis. A wide variety of content in the form of stored signals, such as, for example, text files, images, audio files, video files, web pages, measurements of physical phenomena, and/or the like may be continually acquired, identified, located, retrieved, collected, stored, communicated, etc. Increasingly, content is being acquired, collected, communicated, etc. by a number of electronic devices, such as, for example, embedded computing devices leveraging existing Internet and/or like infrastructure as part of a so-called "Internet of Things" (IoT), such as via a variety of protocols, domains, and/or applications. IoT may typically comprise a system of interconnected and/or internetworked physical computing devices capable of being identified, such as uniquely via an assigned Internet Protocol (IP) address, for example. Devices, such as IoT-type devices, for example, may include computing resources embedded into hardware so as to facilitate and/or support a device's ability to acquire, collect, process and/or transmit content over one or more communications networks. IoT-type devices, for example, may comprise a wide variety of embedded devices, such as, for example, automobile sensors, biochip transponders, heart monitoring implants, thermostats, kitchen appliances, locks or like fastening devices, solar panel arrays, home gateways, controllers, and/or the like.

In some instances, challenges may be faced in improving performance of communications between and/or among IoT-type devices and/or other electronic device types, for example. An aspect of communications related to IoT-type devices and/or other electronic device types, for example, may involve processing of one or more queries that may be generated at IoT-type devices and/or other electronic device types.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
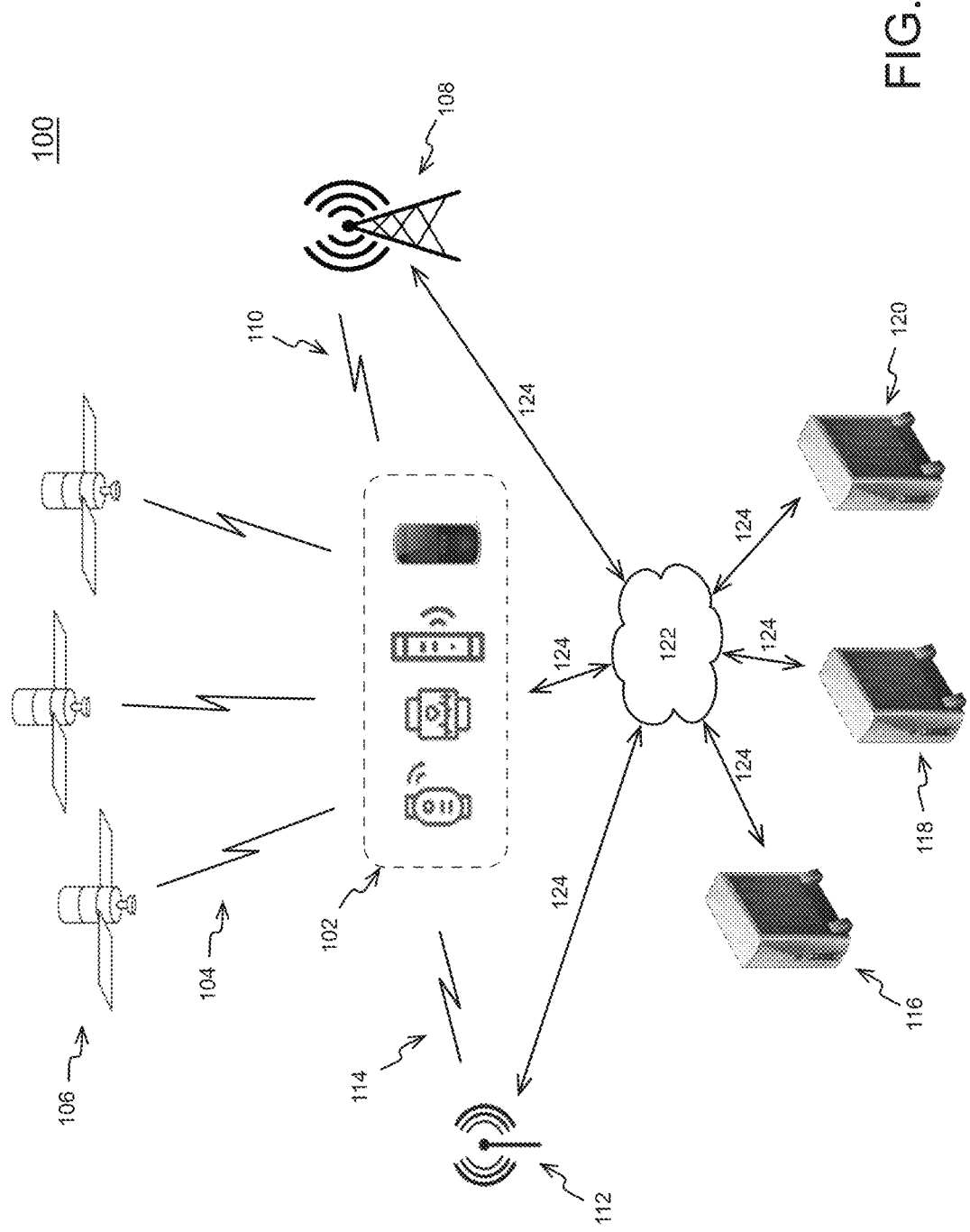
FIG. 1 is a schematic block diagram depicting an embodiment of an example system including one or more server computing devices and/or one or more IoT-type devices.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned above, the World Wide Web or simply the Web, provided by the Internet, is growing rapidly, at least in part, from the large amount of content being added seemingly on a daily basis. A wide variety of content in the form of stored signals, such as, for example, text files, images, audio files, video files, web pages, measurements of physical phenomena, and/or the like may be continually acquired, identified, located, retrieved, collected, stored, communicated, etc. Increasingly, content is being acquired, collected, communicated, etc. by a number of electronic devices, such as, for example, embedded computing devices leveraging existing Internet and/or like infrastructure as part of a so-called "Internet of Things" (IoT), such as via a variety of protocols, domains, and/or applications. IoT may typically comprise a system of interconnected and/or internetworked physical computing devices capable of being identified, such as uniquely via an assigned Internet Protocol (IP) address, for example. Devices, such as IoT-type devices, for example, may include computing resources embedded into hardware so as to facilitate and/or support a device's ability to acquire, collect, process and/or transmit content over one or more communications networks. In this context, "IoT-type devices" and/or the like refer to one or more electronic and/or computing devices capable of leveraging existing Internet and/or like infrastructure as part of the IoT, such as via a variety of applicable protocols, domains, applications, etc. In particular implementations, IoT-type devices, for example, may comprise a wide variety of embedded devices, such as, for example, automobile sensors, biochip transponders, heart monitoring implants, thermostats, kitchen appliances, locks or like fastening devices, solar panel arrays, home gateways, controllers, and/or the like. Although embodiments described herein may refer to IoT-type devices, claimed subject matter is not limited in scope in these respects. For example, although IoT-type devices may be described, claimed subject matter is intended to include use of any of a wide range of electronic device types, including a wide range of computing device types.

In some instances, challenges may be faced in improving performance of communications between and/or among IoT-type devices and/or other electronic device types, for example. An aspect of communications related to IoT-type devices and/or other electronic device types, for example, may involve processing of one or more queries that may be generated at IoT-type devices and/or other electronic device types.

"Electronic content," "content" and/or the like as the terms are used herein should be interpreted broadly and refers to signals, such signal packets, for example, and/or states, such as physical states on a memory device, for example, but otherwise are employed in a manner irrespective of format, such as any expression, representation, realization, and/or communication, for example. Content may comprise, for example, any information, knowledge, and/or experience, such as, again, in the form of signals and/or states, physical or otherwise. In this context, "electronic" or "on-line" content refers to content in a form that although not necessarily capable of being perceived by a human, (e.g., via human senses, etc.) may nonetheless be transformed into a form capable of being so perceived, such as visually, haptically, and/or audibly, for example. Non-limiting examples may include text, audio, images, video, security parameters, combinations, or the like. Thus, content may be stored and/or transmitted electronically, such as before or after being perceived by human senses. In general, it may be understood that electronic content may be intended to be referenced in a particular discussion, although in the particular context, the term "content" may be employed for ease of discussion. Specific examples of content may include, for example, computer code, data, metadata, message, text, audio file, video file, data file, web page, or the like. Claimed subject matter is not intended to be limited to these particular examples, of course.

FIG. 1 is a schematic diagram illustrating features associated with an implementation of an example operating environment 100 capable of facilitating and/or supporting one or more operations and/or techniques for infrastructure for updating and/or managing IoT-type devices, illustrated generally herein at 102. As was indicated, the IoT is typically a system of interconnected and/or internetworked physical devices in which computing may be embedded into hardware so as to facilitate and/or support devices' abilities to acquire, collect and/or communicate content over one or more communications networks, for example, at times, without human participation and/or interaction. As mentioned, IoT-type devices may include a wide variety of stationary and/or mobile devices, such as, for example, automobile sensors, biochip transponders, heart monitoring implants, kitchen appliances, locks or like fastening devices, solar panel arrays, home gateways, smart gauges, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio and/or video devices, personal navigation devices, and/or the like.

It should be appreciated that operating environment 100 is described herein as a non-limiting example that may be implemented, in whole or in part, in a context of various wired and/or wireless communications networks and/or any suitable portion and/or combination of such networks. For example, these or like networks may include one or more public networks (e.g., the Internet, the World Wide Web), private networks (e.g., intranets), wireless wide area networks (WWAN), wireless local area networks (WLAN, etc.), wireless personal area networks (WPAN), telephone networks, cable television networks, Internet access networks, fiber-optic communication networks, waveguide communication networks and/or the like. It should also be noted that claimed subject matter is not limited to a particular network and/or operating environment. Thus, for a particular implementation, one or more operations and/or techniques for updating and/or managing IoT-type devices may be performed, at least in part, in an indoor environment and/or an outdoor environment, or any combination thereof.

Thus, as illustrated, in a particular implementation, one or more IoT-type devices 102 may, for example, receive and/or acquire satellite positioning system (SPS) signals 104 from SPS satellites 106. In some instances, SPS satellites 106 may be from a single global navigation satellite system (GNSS), such as the GPS or Galileo satellite systems, for example. In other instances, SPS satellites 106 may be from multiple GNSS such as, but not limited to, GPS, Galileo, Glonass, or Beidou (Compass) satellite systems, for example. In certain implementations, SPS satellites 106 may be from any one several regional navigation satellite systems (RNSS) such as, for example, WAAS, EGNOS, QZSS, just to name a few examples.

At times, one or more IoT-type devices 102 may, for example, transmit wireless signals to and/or receive wireless signals from a suitable wireless communication network. In one example, one or more IoT-type devices 102 may communicate with a cellular communication network, such as by transmitting wireless signals to and/or receiving wireless signals from one or more wireless transmitters capable of transmitting and/or receiving wireless signals, such as a base station transceiver 108 over a wireless communication link 110, for example. Similarly, one or more IoT-type devices 102 may transmit wireless signals to and/or receive wireless signals from a local transceiver 112 over a wireless communication link 114, for example. Base station transceiver 108, local transceiver 112, etc. may be of the same or similar type, for example, and/or may represent different types of devices, such as access points, radio beacons, cellular base stations, femtocells, an access transceiver device, or the like, depending on an implementation. Similarly, local transceiver 112 may comprise, for example, a wireless transmitter and/or receiver capable of transmitting and/or receiving wireless signals. For example, at times, wireless transceiver 112 may be capable of transmitting and/or receiving wireless signals from one or more other terrestrial transmitters and/or receivers.

In a particular implementation, local transceiver 112 may, for example, be capable of communicating with one or more IoT-type devices 102 at a shorter range over wireless communication link 114 than at a range established via base station transceiver 108 over wireless communication link 110. For example, local transceiver 112 may be positioned in an indoor or like environment and/or may provide access to a wireless local area network (WLAN, e.g., IEEE Std. 802.11 network, etc.) and/or wireless personal area network (WPAN, e.g., Bluetooth® network, etc.). In another example implementation, local transceiver 112 may comprise a femtocell and/or picocell capable of facilitating communication via link 114 according to an applicable cellular or like wireless communication protocol. Again, it should be understood that these are merely examples of networks that may communicate with one or more IoT-type devices 102 over a wireless link, and claimed subject matter is not limited in this respect. For example, in some instances, operating environment 100 may include a larger number of base station transceivers 108, local transceivers 112, networks, terrestrial transmitters and/or receivers, etc.

In an implementation, one or more IoT-type devices 102, base station transceiver 108, local transceiver 112, etc. may, for example, communicate with one or more servers, referenced herein at 116, 118, and 120, over a network 122, such as via one or more communication links 124. Network 122 may comprise, for example, any combination of wired and/or wireless communication links. In a particular implementation, network 122 may comprise, for example, Internet Protocol (IP)-type infrastructure capable of facilitating or supporting communication between one or more IoT-type devices 102 and one or more servers 116, 118, 120, etc. via local transceiver 112, base station transceiver 108, directly, etc. In another implementation, network 122 may comprise, for example cellular communication network infrastructure, such as a base station controller and/or master switching center to facilitate and/or support mobile cellular communication with one or more IoT-type devices 102. Servers 116, 118 and/or 120 may comprise any suitable servers or combination thereof capable of facilitating or supporting one or more operations and/or techniques discussed herein. For example, servers 116, 118 and/or 120 may comprise one or more update servers, back-end servers, management servers, archive servers, location servers, positioning assistance servers, navigation servers, map servers, crowdsourcing servers, network-related servers, or the like.

Even though a certain number of computing platforms and/or devices are illustrated herein, any number of suitable computing platforms and/or devices may be implemented to facilitate and/or support one or more techniques and/or processes associated with operating environment 100. For example, at times, network 122 may be coupled to one or more wired and/or wireless communication networks (e.g., WLAN, etc.) so as to enhance a coverage area for communications with one or more IoT-type devices 102, one or more base station transceivers 108, local transceiver 112, servers 116, 118, 120, or the like. In some instances, network 122 may facilitate and/or support femtocell-based operative regions of coverage, for example. Again, these are merely example implementations, and claimed subject matter is not limited in this regard.

In this context, "IoT-type devices" refer to one or more electronic and/or computing devices capable of leveraging existing Internet or like infrastructure as part of the so-called "Internet of Things" or IoT, such as via a variety of applicable protocols, domains, applications, etc. As was indicated, the IoT is typically a system of interconnected and/or internetworked physical devices in which computing may be embedded into hardware so as to facilitate and/or support devices' ability to acquire, collect, and/or communicate content over one or more communications networks, for example, at times, without human participation and/or interaction. IoT-type devices 102, for example, may include a wide variety of stationary and/or mobile devices, such as, for example, automobile sensors, biochip transponders, heart monitoring implants, kitchen appliances, locks or like fastening devices, solar panel arrays, home gateways, smart gauges, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio or video devices, personal navigation devices, and/or the like, to name a few non-limiting examples. Typically, in this context, a "mobile device" refers to an electronic and/or computing device that may from time to time have a position or location that changes, and/or a stationary device refers to a device that may have a position or location that generally does not change. In some instances, IoT-type devices, such as IoT-type devices 102, may be capable of being identified, such as uniquely, via an assigned Internet Protocol (IP) address, as one particular example, and/or having an ability to communicate, such as receive and/or transmit electronic content, for example, over one or more wired and/or wireless communications networks.

Figure 2:
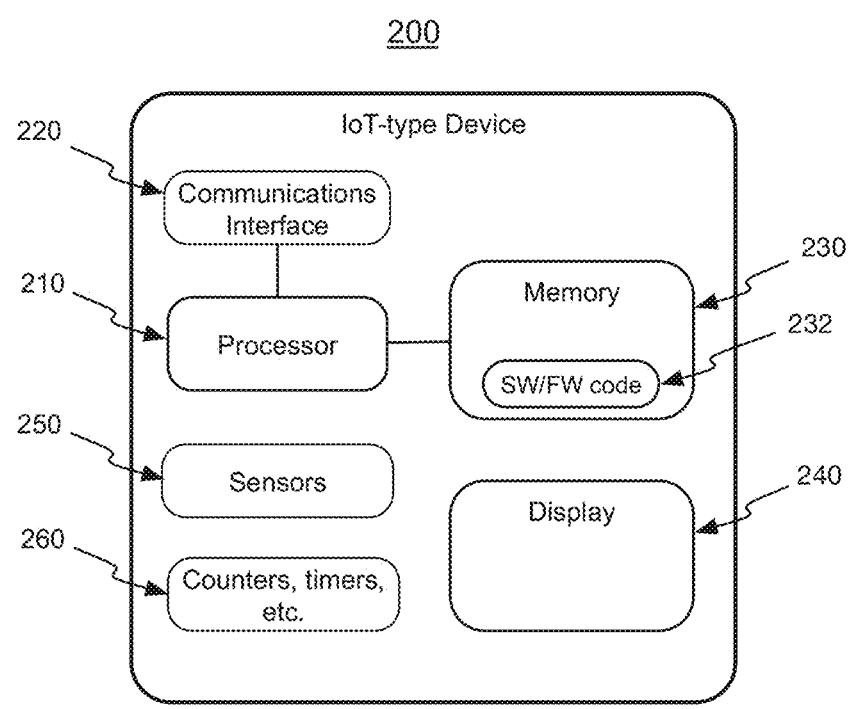
FIG. 2 is a schematic block diagram depicting an embodiment of an example Internet of Things (IoT) type device.

FIG. 2 is an illustration of an embodiment 200 of an example particular IoT device. Of course, claimed subject matter is not limited in scope to the particular configurations and/or arrangements of components depicted and/or described for example devices mentioned herein. In an embodiment, an IoT-type device, such as 200, may comprise one or more processors, such as processor 210, and/or may comprise one or more communications interfaces, such as communications interface 220. In an embodiment, one or more communications interfaces, such as communications interface 220, may enable wireless communications between an electronic device, such as an IoT-type device 200, and one or more other computing devices. In an embodiment, wireless communications may occur substantially in accordance any of a wide range of communication protocols, such as those mentioned herein, for example.

In a particular implementation, an IoT-type device, such as IoT-type device 200, may include a memory, such as memory 230. In a particular implementation, memory 230 may comprise a non-volatile memory, for example. Further, in a particular implementation, a memory, such as memory 230, may have stored therein executable instructions, such as for one or more operating systems, communications protocols, and/or applications, for example. A memory, such as 230, may further store particular instructions, such as software and/or firmware code 232, that may be updated via one or more example implementations and/or embodiments described herein. Further, in a particular implementation, an IoT-type device, such as IoT-type device 200, may comprise a display, such as display 240, and/or one or more sensors, such as one or more sensors 250. As utilized herein, "sensors" and/or the like refer to a device and/or component that may respond to physical stimulus, such as, for example, heat, light, sound pressure, magnetism, particular motions, etc., and/or that may generate one or more signals and/or states in response to physical stimulus. Example sensors may include, but are not limited to, one or more accelerometers, gyroscopes, thermometers, magnetometers, barometers, light sensors, proximity sensors, hear-rate monitors, perspiration sensors, hydration sensors, breath sensors, cameras, microphones, etc., and/or any combination thereof.

In particular implementations, IoT-type device 200 may include one or more timers and/or counters and/or like circuits, such as circuitry 260, for example. In an embodiment, one or more timers and/or counters and/or the like may track one or more aspects of device performance and/or operation. For example, timers, counters, and/or other like circuits may be utilized, at least in part, by IoT-type device 200 to determine measures of fitness, for example, and/or to otherwise generate feedback content related to testing results, in particular implementations.

Although FIG. 2 depicts a particular example implementation of an IoT-type device, such as IoT-type device 200, other embodiments may include other types of electronic and/or computing devices. Example types of electronic and/or computing devices may include, for example, any of a wide range of digital electronic devices, including, but not limited to, desktop and/or notebook computers, high-definition televisions, digital video players and/or recorders, game consoles, satellite television receivers, cellular telephones, tablet devices, wearable devices, personal digital assistants, mobile audio and/or video playback and/or recording devices, or any combination of the foregoing.

In an embodiment, a client computing device (e.g., via execution of an application), such as IoT-type device 200, may generate one or more queries, such as a query that may include a content request. A variety of query languages may exist to formulate queries for specific content being sought. Examples of query languages may include Structured Query Language (SQL), XML Path Language (XPATH), and/or GraphQL, but these are just illustrative examples. The term Structured Query Language, SQL, and/or similar terms are intended to refer to any version, now known and/or to be later developed of the Structured Query Language. Similarly, the term XML Path Language, XPATH, and/or similar terms are intended to refer to any version, now known and/or to be later developed, of the XML Path Language. Likewise, the term GraphQL, and/or similar terms are intended to refer to any version, now known and/or to be later developed, of the GraphQL query language. Furthermore, as used herein, the terms query, query request, queries and/or the like are intended to refer to one or more queries formulated in a particular query language, such as one of the foregoing languages, for example. Also, although embodiments and/or implementations described herein may refer to queries, other embodiments and/or implementations may include other types of operations such as mutations, for example.

In embodiments, GraphQL may comprise a query language for an application programming interface (API) and/or a server-side runtime service for executing queries using a type system and/or the like that may be defined for content to be sought. In particular implementations, GraphQL may not be tied to any specific database and/or storage engine and/or may instead be backed by existing code and/or content.

A GraphQL schema, for example, may comprise a specification of a set of content types and/or structures, levels of nesting, and/or fields, etc., for example, which may indicate content available, such as to be queried. Similarly, a GraphQL query path may specify that for certain content fields a path may be followed and/or traversed to locate such content, such as in a repository. A GraphQL query shape likewise may specify relationships within a GraphQL schema, such as for content types, etc., including interrelationships, nesting and/or other forms of association, for example.

As utilized herein, "graph" and/or the like represents a structure that may include points connected by edges, for example. Additionally, "data graph" and/or the like represents a model of content (e.g., data) available from a service structured as a graph. In an implementation, a graph may have a number of properties. For example, in an implementation, a graph may comprise "points" and/or the like that may represent objects and/or properties. Points may optionally contain binary or textual data, for example. Graphs may also include "edges" and/or the like that may represent relationships, for example. Also, in implementations, graphs may include queries that may terminate at certain points and/or that may change a graph in accordance with the following: a) queries may add or remove points; b) queries may add or remove edges connecting points; and/or c) queries may add, remove, or modify the data attached to points, for example. In implementations, one or more points may be tagged as roots for different categories of queries. For example, a query root may be provided such that queries that begin at a query root provide, but do not modify, graph content. In an implementation, a separate mutation root may be identified such that queries that begin at the mutation root may both modify and read graph data, for example.

As utilized herein, a "graph schema" and/or the like represents a description of an expected structure of a data graph. In an implementation, rather than enumerate points and edges (e.g., a representation that may be as large or even frequently much larger than content to be sought itself), a graph schema may provide a type system for the data graph with various example properties. For example, a graph schema may assign a "type" to points (e.g., every point in particular implementations) within a data graph. In implementations, a schema may specify constraints some point p may satisfy to be included within a type, including but not limited to: a) presence of one or more edges fulfilling arbitrary criteria beginning at p; and b) presence and/or shape of content contained by a point, for example. Further, for example, a graph schema may assign a "field" to edges (e.g., every edge in particular implementations) within a data graph. For example, fields may comprise a generalization over edges. In implementations, whereas an edge may describe a connection between specific objects in a data graph, fields may describe a connection between types. That is, fields may represent a class of relationship that may be represented between objects, for example. Also, in implementations, fields may be parameterized to represent a wider range of relationships. For example, a schema may define a User.friends(first: Int)→[User] field, which may connect a user to a list of their friends, limited in size to the specified number of friends. This example field may represent an unbounded number of edges, including "user A's first friend on the service", "user A's first two friends", "user A's first three friends", etc.

In implementations, a graph schema may define a "type graph" that may represent relationships between types. For example, within a type graph, points may comprise types and/or edges that may comprise "casts" representing relationships that types may have with each other. In a particular implementation, given two types A and B, the following relationships are possible: a) A may comprise a proper superset of B if all points within B also fall within A. In this case, B may have an unconditional edge to A and A may have a conditional edge to B; b) A may overlap with B if some but not all points within B are in A and some but not all points within A are in B. In this case, A and B may have conditional edges to each other; and/or c) A and B may be non-overlapping if there exist no points which are shared between them. In this case, no edges will exist between A and B. In implementations, there may exist a number of possible textual representations (e.g., encodings) of a graph schema, for example.

In implementations, a GraphQL service may be generated at least in part by defining types and/or fields on those types. For example, a GraphQL service that may indicate an identity of a logged-in user is (e.g., "me") as well as that logged-in user's name might look like the following:

```
type Query {
    me: User
}
type User {
    id: ID
    name: String
}
```

In implementations, once running (e.g., at a URL on a web service) a GraphQL service (e.g., endpoint) may receive GraphQL queries to validate and/or execute. A GraphQL service may first check a query to ensure it refers to the types and/or fields defined and then may run specified functions to produce a result. For example, a query:

```
{
    me {
        name
    }
}
``` may generate the following JSON result, for example:

```
{
    "me": {
        "name": "Luke Skywalker"
    }
}
```

In implementations, an example GraphQL query language may relate at least in part to selecting fields on objects.

```
{
    hero {
        name
        appearsIn
    }
}
```

```
{
    "data": {
        "hero": {
            "name": "R2-D2",
            "appearsIn": [
                "NEWHOPE",
                "EMPIRE",
                "JEDI"
            ]
        }
    }
}
```

For the example query shown above, processing may begin with a special "root" object. Subsequently, the "hero" field may be selected, for example. For the object returned by "hero," the "name" and "appearsIn" fields may be selected, for example.

In at least some circumstances, it may be advantageous and/or beneficial to have a more exact description of the content (e.g., data) one may ask for—what fields can one select? What kinds of objects might the fields return? What fields are available on those sub-objects? In implementations, a schema, such as a GraphQL schema, may help provide the aforementioned advantages and/or benefits, as explained more fully below.

In implementations, a schema, such as a GraphQL schema, may define a set of types which may describe (e.g., may completely describe in particular implementations) a set of possible content one may access on a particular service. In an implementation, responsive at least in part to receiving one or more queries, the one or more queries may be validated and/or executed against the particular schema, for example.

In implementations, GraphQL services may be written in any language. Because one may not rely on a specific programming language syntax, like JavaScript, to discuss GraphQL schemas, an example GraphQL schema language, similar in at least some respects to a GraphQL query language, may be utilized herein for various examples to allow language-agnostic discussion of schemas, such as GraphQL schemas. Although example embodiments and/or implementations may be described herein, at least in part, in connection with GraphQL, subject matter is not limited in scope in this respect. That is, GraphQL is utilized herein as a non-limiting example.

In implementations, basic components of a GraphQL schema may comprise object types, which may represent a kind of object that may be fetched from a service, and what fields the object types may have. In an example GraphQL schema language, an example object type may be represented as follows:

```
type Character {
    name: String!
    appearsIn: [Episode!]!
}
```

For the example above, "Character" may comprise a GraphQL Object Type, meaning it's a type with some fields. Many, or most, of the types in a schema may comprise object types, for example. Also, for example, "name" and "appearsIn" may comprise fields on the Character type. For example, name and appearsIn may comprise fields that may appear in a part of a GraphQL query that operates on the Character type. "String," for example, may comprise one of the built-in scalar types. Scalar types may resolve to a single scalar object and may not have sub-selections in a query, for example. Further, "String!" may specify that a field is non-nullable, meaning that the GraphQL service may always provide a value when this field is queried. In the example type language, non-nullable fields may be represented as those with an exclamation mark. Additionally, [Episode!]! may represents an array of Episode objects. Because it may also be non-nullable, one may expect an array (e.g., with zero or more items) in response to the appearsIn field being queried. Also, because Episode! may also be non-nullable, one may expect individual items of the array to be Episode objects, for example.

The above discussion may provide some understanding of what an example GraphQL object type may look like and/or may also provide some understanding of how to read some basics of an example GraphQL-type language. In implementations, an organization may advantageously expose a single graph that may provide a unified interface for querying various combinations of content sources. However, it may be challenging to represent an enterprise-scale graph with a single, monolithic GraphQL service, for example.

To address this challenge, at least in part, a federated approach may be utilized to divide a graph implementation into multiple services that may be maintained more easily by different teams. An example architecture utilizing a federated approach may include, for example, a collection of subgraphs (e.g., usually represented as different API services) that may individually define a particular GraphQL schema. For example, multiple GraphQL subgraphs may be declaratively composed to create a unified set of types in a unified supergraph schema. Further, for example, a GraphQL gateway may utilize the declaratively composed unified supergraph schema (e.g., composed from multiple GraphQL subgraph schemas) to execute operations, such as queries, for example, across the multiple GraphQL subgraphs to provide clients access to all of the types and fields in the composed supergraph.

Figure 3:
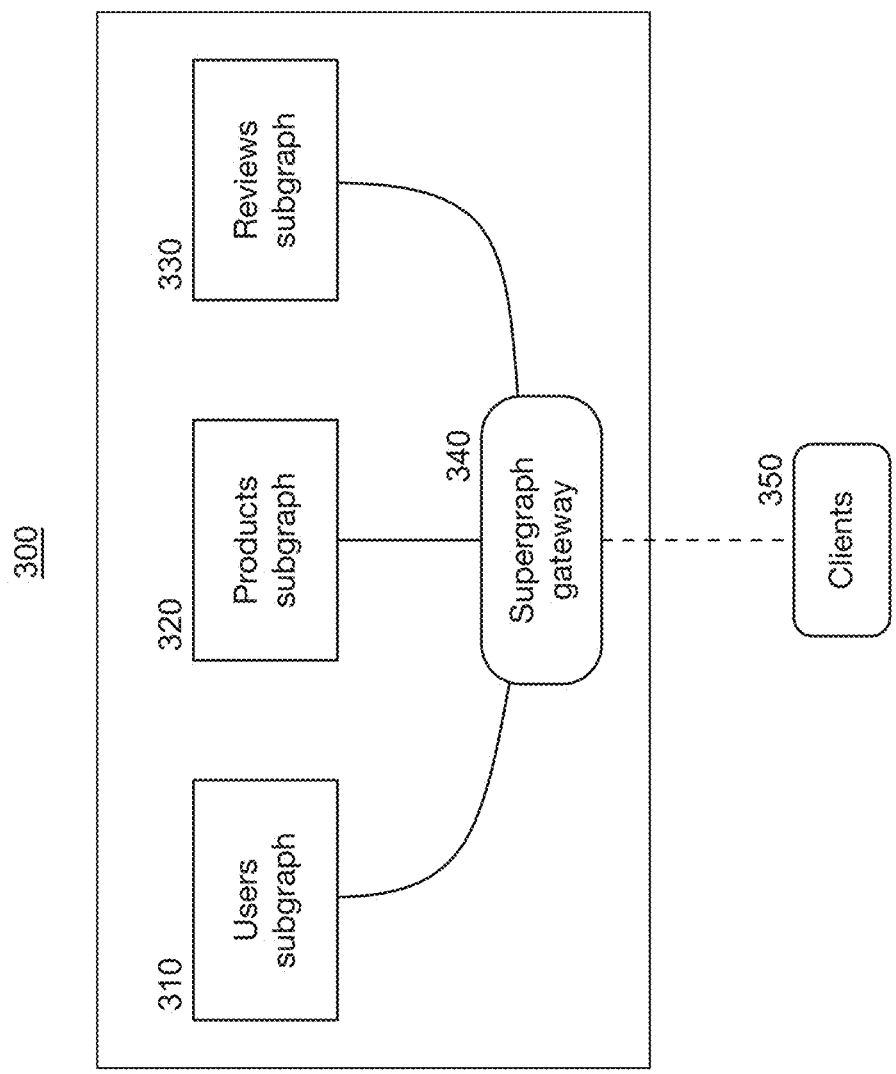
FIG. 3 depicts an example graph implemented across multiple API services.

For example, as depicted in FIG. 3, a graph (e.g., supergraph), such as supergraph 300, may have its implementations spread across multiple API services including, for example, a first subgraph, such as "Users" subgraph 310, a second subgraph, such as "Products" subgraph 320, and/or a third subgraph, such as "Reviews" subgraph 330. Subgraphs 310, 320 and/or 330, for example, may be composed into supergraph 300. By querying supergraph 300, one or more client computing devices or clients 350 may query any or all of subgraphs 310, 320 and/or 330 at the same time, for example. In an implementation, a gateway, such as supergraph gateway 340, may serve as an access point for a supergraph, such as supergraph 300. In an implementation, a gateway, such as supergraph gateway 340, may receive incoming GraphQL operations (e.g., queries) and/or may intelligently distribute the incoming GraphQL operations across subgraphs, such as subgraphs 310, 320 and/or 330. From the perspective of clients 350, querying subgraphs via supergraph gateway 340 may look the same as querying any other GraphQL server (e.g., no special configuration may be needed), for example.

Unlike other distributed GraphQL architectures such as, for example, schema stitching, a federated approach may utilize a declarative composition model that may enable individual subgraphs to implement a specified part of a composed supergraph for which the individual subgraphs may be responsible. Unlike schema stitching, which may require manually authored imperative code in Javascript (a specific programming language) to stitch schemas together at runtime, for example, a federated approach may declaratively compose subgraph schemas into a single unified supergraph schema, validate a single supergraph schema at build-time for correctness, for example, and/or may load the supergraph schema into a federated GraphQL runtime like a GraphQL gateway to serve client queries and perform other GraphQL operations at runtime. Unlike schema stitching, a federated approach may use GraphQL schema to describe the modular subgraph schemas that will be composed, which is independent of the programming language used to build a subgraph server. As such, a declarative, federated approach to composing subgraph schemas into a unified supergraph schema may be agnostic to the programming language used to author the GraphQL server, unlike schema stitching which may be tied to Javascript, a specific programming language. A federated approach may also enable one to add, remove, and/or refactor subgraphs without incurring downtime for production graphs, for example.

Unlike other data access approaches, for example databases which also use schemas and/or may have a query planner to execute queries, a federated GraphQL architecture may use GraphQL instead of SQL to define data structures and queries and/or may access GraphQL subgraphs on a network instead of database tables on disk. Also, a federated GraphQL approach may not in at least some circumstances offer a durable and/or persistent store of data itself, but rather may be layered on top of underlying network services (e.g., GraphQL APIs, REST APIs, and/or microservices) that may in turn use a database or other data store. Relational databases may be built with multiple tables that may refer to each other. For example, rows from one table may refer to specific rows in another table which may be connected by some ID column(s). One may SELECT fields FROM multiple database tables and join them together using keys or IDs that match a WHERE clause. In this way, one may spread the data for an entity across multiple database tables and/or may join them together using a SQL query that may then be processed by a database query planning engine to create a query plan, execute it by fetching data from the underlying database tables on disk and/or collate and return the results to the client. In a similar way, a federated approach may allow one to spread the implementation of entity types in a graph across multiple subgraphs where a GraphQL gateway can process a query and/or join entity fields together by dynamically creating a query plan at runtime to advantageously (e.g., optimally) fetch the entity fields from the respective subgraph API servers using entity keys. A federated GraphQL approach may be agnostic to the underlying database or microservice technologies used and may be used to create a unified graph layer on top of multiple underlying microservices (e.g., REST APIs, gRPC, etc.) that may in turn each use different database technologies. A federated approach may provide a single GraphQL schema that application developers may use to access data and services in an organization or across organizations on the public Internet, for example.

In federated GraphQL implementations, libraries may be provided to allow a server to act as a GraphQL subgraph and/or as a GraphQL gateway, for example. Such components may be implemented in any language and/or framework.

In an implementation, a federated approach may be adopted incrementally. For example, for implementations using a monolithic GraphQL server, functionality may be converted to a federated approach one service at a time. Further, for example, for implementations using other architectures (e.g., schema stitching), support for a federated approach may be added to existing services one at a time. In such cases, clients may continue to work and/or may have no way to distinguish between different graph implementations. Thus, a federated approach may be adopted and/or implemented without adverse implications to clients, for example.

In implementations, a federated approach may encourage a design principle that may be referred to as "separation of concerns." Such a principle may enable different teams within an enterprise to work on different products and/or features within a single graph without interfering with each other.

When considering how to split a single GraphQL schema across multiple subgraphs, it may seem straightforward to divide schemas up by type. For example, a "users" subgraph may define a User type, a "products" subgraph may define a Product type, and so on:

```
Users subgraph:
type User {
  id: ID!
  name: String
  reviews: [Review]
  purchases: [Product]
}
Products subgraph:
type Product {
  id: ID!
  name : String
  price: String
  reviews: [Review]
}
Reviews subgraph:
type Review {
  id: ID!
  body: String
  author: User
  product: Product
}
```

Although this separation may appear relatively straightforward, it may pose issues. For example, a particular feature and/or concern may sometimes span multiple types. Consider, for example, the User.purchases field of the User type in the above schema. Even though this field is a member of the User type, a list of Products should probably be populated by the Products subgraph rather than the Users subgraph. In implementations, by defining the User.purchases field in the Products subgraph instead, the subgraph that defines the field may also be the subgraph that specifies how to populate the field. In some circumstances, the Users subgraph might not even have access to the content store that contains product content, for example. Also, by defining the User.purchases field in the Products subgraph, for example, the team that manages product content may contain product-related logic in a single subgraph for which they may be responsible.

The following example schema uses a federated approach to divide the same set of types and fields across the same three subgraphs (note: some federation-specific syntax is omitted here for clarity and/or ease of explanation):

```
Users subgraph
type User {
  id: ID!
  name: String
}
Products subgraph
type Product {
  id: ID!
```
```
  name : String
  price: String
}
type User {
  id: ID!
  purchases: [Product]
}
Reviews subgraph
type Review {
  id: ID!
  body: String
  author: User
  product: Product
}
type User {
  id: ID!
  reviews: [Review]
}
type Product {
  id: ID!
  reviews: [Review]
}
```

The difference is that now, individual subgraphs may define (e.g., may at least mostly define) types and/or fields that they are capable of, and/or may be responsible for, populating from their respective content stores, for example. The result may be the best of both worlds: an implementation that keeps code for a given feature in a single subgraph and separated from unrelated concerns and a product-centric schema with rich types that may reflect the way an application developer may want to consume the graph, for example.

Figure 4:
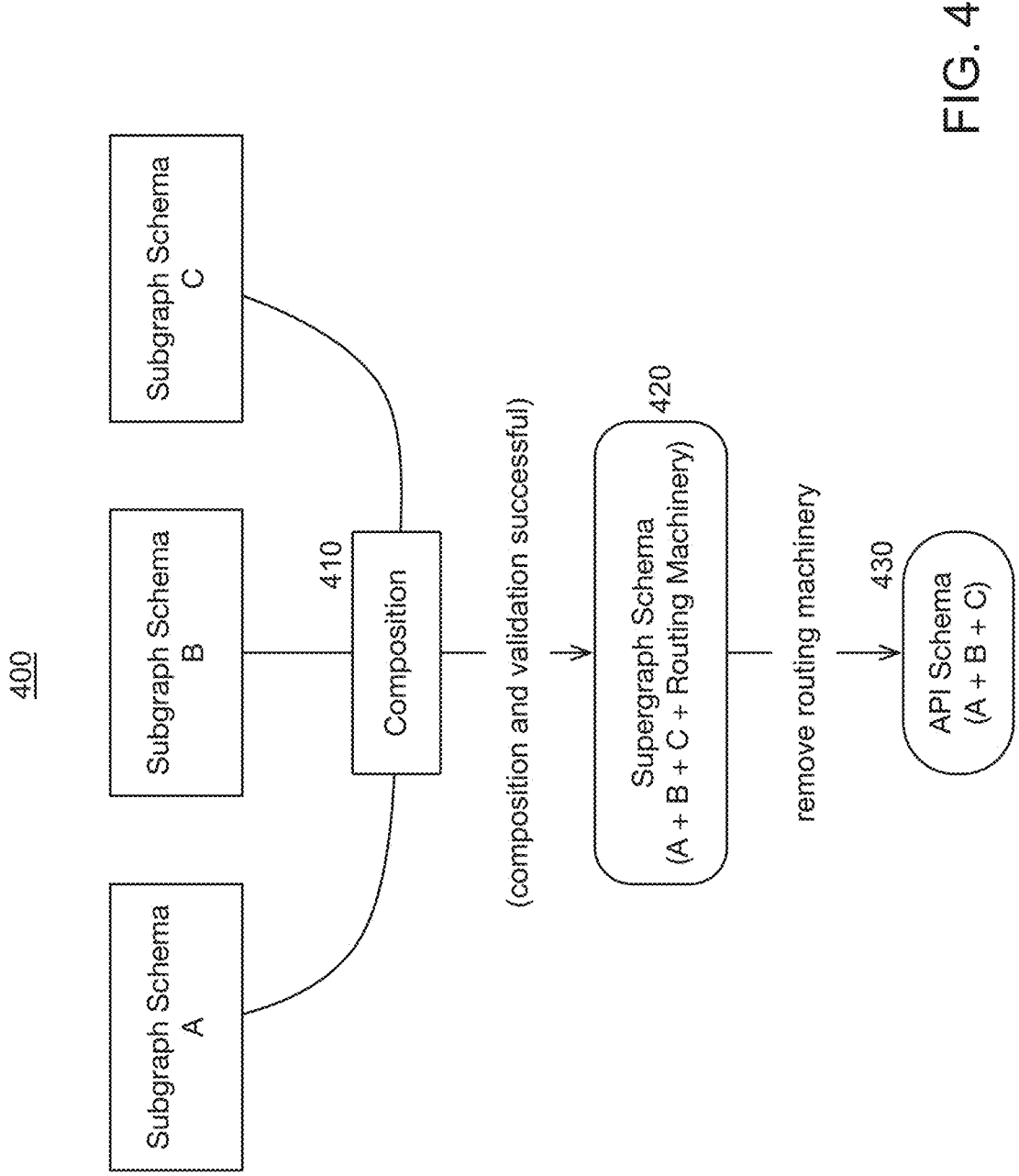
FIG. 4 is an illustration depicting an example federated graph.

FIG. 4 is an illustration depicting an example federated graph 400. In implementations, a federated graph, such as graph 400, may utilize multiple types of GraphQL schemas. For example, subgraphs schemas, such as subgraph schemas A, B, and/or C, may individually comprise distinct schemas that may indicate which types and/or fields that a composed supergraph schema, such as supergraph schema 420, may be responsible for resolving. A supergraph schema, such as supergraph schema 420, may comprise the result of performing composition, such as composition operation 410, on a collection of subgraph schemas, such as subgraph schemas A, B, and/or C. A supergraph schema may combine all of the types and/or fields from subgraph schemas plus some federation-specific directives that may instruct a gateway as to which subgraphs may be responsible for resolving particular fields, in implementations.

Additionally, an API schema, such as API schema 430, may resemble a supergraph schema, such as supergraph schema 420, in some respects, but it may omit types, fields, and/or directives that may be considered "machinery" and may not be part of a public API that GraphQL clients use directly. This may include federation-specific and/or user-defined directives, for example. An API schema, such as API schema 430, may be exposed in a GraphQL gateway to a GraphQL API's consumers who may not need to know any internal implementation details about a particular graph, for example.

Consider an example. Below, schemas may be defined for three subgraphs in a basic example e-commerce application. Individual subgraphs may be implemented as a separate GraphQL API, for example:

```
Users subgraph
type Query {
```

```
    me: User
}
type User @key(fields: "id") {
    id: ID!
    username: String! @shareable
}
# (Subgraph schemas include
# this to opt in to
# Federation 2 features.)
extend schema
    @link(url: "https://specs.apollo.dev/federation/v2.0",
    import: ["@key", "@shareable"])
Products Subgraph
    type Query {
        topProducts(first: Int = 5): [Product]
    }
    type Product @key(fields: "upc") {
        upc: String!
        name: String!
        price: Int
    }
    extend schema
        @link(url: "https://specs.apollo.dev/federation/v2.0",
        import: ["@key", "@shareable"])
Reviews subgraph
    type Review {
        body: String
        author: User @provides(fields: "username")
        product: Product
    }
    type User @key(fields: "id") {
        id: ID!
        username: String! @external
        reviews: [Review]
    }
}
type Product @key(fields: "upc") {
    upc: String!
    reviews: [Review]
}
# (This subgraph uses additional
# federated directives)
extend schema
    @link(url: "https://specs.apollo.dev/federation/v2.0",
    import: ["@key", "@shareable", "@provides", "@external"])
```

As the above example schemas show, multiple subgraphs may contribute unique fields to a single type. For example, the Products subgraph and the Reviews subgraph both contribute fields to the Product type.

In implementations, a supergraph schema, such as supergraph schema 800, may comprise the output of schema composition, such as schema composition operation 410 depicted in FIG. 4. In implementations, a supergraph schema may provide a gateway, such as gateway 340, with the name and endpoint URL for the individual subgraphs. A supergraph schema, such as supergraph schema 420, for example, may include types, fields and/or directives (e.g., all, most, etc. of the types, fields and/or directives) defined by the subgraph schemas, for example. Also, in an implementation, a supergraph schema may tell the gateway which of the subgraph schemas can resolve which GraphQL fields, for example. A supergraph schema example provided below represents an example result of a composition operation performed utilizing the example subgraph schemas provided above.

```
Supergraph Schema
    @link(url: "https://specs.apollo.dev/link/v1.0")
    @link(url: "https://specs.apollo.dev/join/v0.2", for: EXECUTION)
{
    query: Query
}
directive @join__field(graph: join__Graph!, requires: join__FieldSet, provides:
join__FieldSet, type:
        String, external: Boolean, override: String, usedOverridden: Boolean) repeatable on
        FIELD_DEFINITION | INPUT_FIELD_DEFINITION
directive @join__graph(name: String!, url: String!) on ENUM_VALUE
directive @join__implements(graph: join__Graph!, interface: String!) repeatable on
OBJECT |
        INTERFACE
directive @join__type(graph: join__Graph!, key: join__FieldSet, extension: Boolean! = false,
        resolvable: Boolean! = true) repeatable on OBJECT | INTERFACE | UNION | ENUM
|
        INPUT_OBJECT | SCALAR
directive @link(url: String, as: String, for: link__Purpose, import: [link__Import]) repeatable
on
        SCHEMA
scalar join__FieldSet
enum join__Graph {
    PRODUCTS @join__graph(name: "products", url: "http://localhost:4003/graphql")
    REVIEWS @join__graph(name: "reviews", url: "http://localhost:4002/graphql")
    USERS @join__graph(name: "users", url: "http://localhost:4001/graphql")
}
scalar link__Import
enum link__Purpose {
    """
    'SECURITY' features provide metadata necessary to securely resolve fields.
    """
    SECURITY
    """
    'EXECUTION' features provide metadata necessary for operation execution.
    """
    EXECUTION
}
type Product
        @join__type(graph: PRODUCTS, key: "upc")
        @join__type(graph: REVIEWS, key: "upc")
{
```

```
    upc: String!
    name: String! @join_field(graph: PRODUCTS)
    price: Int @join_field(graph: PRODUCTS)
    reviews: [Review] @join_field(graph: REVIEWS)
}
type Query
    @join_type(graph: PRODUCTS)
    @join_type(graph: REVIEWS)
    @join_type(graph: USERS)
{
    topProducts(first: Int = 5): [Product] @join_field(graph: PRODUCTS)
    me: User @join_field(graph: USERS)
}
type Review
    @join_type(graph: REVIEWS)
{
    body: String
    author: User @join_field(graph: REVIEWS, provides: "username")
    product: Product
}
type User
    @join_type(graph: REVIEWS, key: "id")
    @join_type(graph: USERS, key: "id")
{
    id: ID!
    username: String! @join_field(graph: REVIEWS, external: true) @join_field(graph:
USERS)
    reviews: [Review] @join_field(graph: REVIEWS)
}
```

In implementations, a gateway, such as gateway 340, may utilize a supergraph schema, such as supergraph schema 420, to generate a GraphQL API schema, such as API schema 430, that clients of the gateway may use to introspect the API schema (e.g., to browse the available types and/or root query fields), to issue GraphQL queries and/or to perform other GraphQL operations on the gateway. An API schema, such as the example API schema provided below, may represent the combination of the various subgraph schemas:

```
type Product {
    name: String!
    price: Int
    reviews: [Review]
    upc: String!
}
type Query {
    me: User
    topProducts(first: Int = 5): [Product]
}
type Review {
    author: User
    body: String
    product: Product
}
type User {
    id: ID!
    reviews: [Review]
    username: String!
}
```

As explained, an enterprise may have one unified graph (e.g., supergraph) as opposed to multiple graphs created by different teams, for example (of course, enterprises may utilize multiple unified supergraphs if they prefer and/or if advantageous). By having a unified graph, the value of GraphQL may be enhanced. More content and/or services may be accessed from a single query. For example, API-side joins may combine all of the fields for a particular entity, even if spread across multiple subgraphs, so that a single integrated result may be returned to the client. In this manner, the client need not stitch together the results, unlike other approaches that may batch individual requests to different subgraphs in a single query and then the client has to manually stitch these results together. API-side joins may be similar in at least some respects to database joins across tables, although with a GraphQL federated approach joins may be performed across multiple subgraphs instead of tables, for example. Having an ability to perform API-side joins rather than client-side joins may provide advantages in terms of runtime performance and/or in terms of simplifying and/or reducing work for application developers, for example. With a GraphQL federated approach, a unified graph may provide for a single source of truth for a number (e.g., all, most, etc.) services and/or may provide faster apps, quicker delivery, reduced maintenance overhead, etc. Also, for example, code, queries, skills and/or experience may be more portable across teams. A unified graph may also yield a central catalog of available content (e.g., schema registry) to which graph users may look, for example. Further, implementation costs may be reduced due at least in part to at least a good deal of graph implementation work not being duplicated across teams. Additionally, for example, central management of a graph may be unified across control policies. "Unified graph" and/or the like in this context refers to a graph composed from one or more graphs, such as subgraphs. "Supergraph" and/or the like refers to an example unified graph composed from one or more subgraphs. "Unified graph" and/or the like and "supergraph" and/or the like may be utilized herein interchangeably.

In implementations, although there may only be a single graph, implementation of that graph may be federated across multiple teams within an enterprise. For example, monolithic architectures may be difficult to scale without specialized infrastructure and/or without significant negative impact to productivity (e.g., due to various teams having to coordinate with each other), and graphs may be no exception. Instead of implementing an organization's entire graph layer in a single codebase, for example, responsibility for defining and/or implementing a graph may be divided across multiple teams. In implementations, individual teams may be responsible for maintaining the portion of a schema that exposes their content and/or services while having the flexibility to develop independently and/or operate on their own release cycle. This may maintain advantages of a single, unified graph while decoupling development efforts across an entity, for example. These example characteristics of a GraphQL federated approach may be key to efficiently scaling a graph across multiple teams so that each team can work on their particular module or slice of the graph in an autonomous fashion with independent delivery of their slice. Thus, GraphQL federated approaches may enable more efficient parallel development by multiple people and/or by multiple teams. By contrast, for other (e.g., monolithic) approaches, scaling development to accommodate multiple teams may result in an exponential increase in overhead (e.g., time, resources, costs, etc.).

In implementations, a fundamental property of federation (FPF) specifies that theoretically possible queries of interest (e.g., one or more queries of interest, all queries of interest, etc.) for a particular supergraph API schema can be served through a number of subqueries on the subgraphs. For a particular federated approach, such as the approach discussed previously, the FPF may be enforced at least in part by specifying particular rules. For example, for a particular federated approach, three object types may be specified, with individual object types being allowed a single type of subgraph layout. For example, for a particular federated approach, if an entity type has an @key, that key may be used to join fields for an entity across subgraphs (and API-side join), using the @key to index and/or select the required fields from each subgraph. The @key may be used to spread the implementation of an entity type across multiple subgraphs (excluding @provides, in an implementation). Otherwise, for a type having no @key, if the type is a root type (e.g., Query or Mutation), then each field can also only be in a single subgraph (e.g., same rule as for @key but a different way to identify the object type). Otherwise, for a type having no @key and is not a root type (e.g., value types), individual fields must be part of all the subgraphs in which the type is defined. Put another way, all definitions of the type must be identical in each subgraph. This may force all subgraph teams to make updates in a single coordinated release, thereby decreasing individual and/or team autonomy that may otherwise be afforded by a federated approach. These particular rules and/or permitted layouts may be relatively easy to understand and they do support and/or enforce the FPF. However, such rules and/or permitted layouts for the particular federated approach may be somewhat limiting, restrictive and/or inflexible, for example.

The particular federated approach discussed above may implicitly use a built-in set of GraphQL directives whose name cannot be changed that may conflict with existing directives otherwise used in non-federated GraphQL schemas, thereby making it difficult or impossible to upgrade an existing GraphQL schema to a federated subgraph schema. For example, the use of "@tag" may be in existing use in a monolithic GraphQL schema and when that monolithic GraphQL schema is converted to a subgraph in a federated supergraph the use of that existing "@tag" directive may conflict with usage in the particular federated approach mentioned above. A further federated approach, such as discussed more fully below, may introduce an "import" mechanism that directed, at least in part, in avoiding GraphQL directive definition naming conflicts between those directives imported for a further federated approach (e.g., often imported automatically by a subgraph library as a convenience feature for subgraph authors) and the set of GraphQL directive definitions manually added to a monograph schema prior to upgrading to a federated subgraph schema.

In implementations, an import mechanism introduced by a further federated approach, such as the further federated approach discussed more fully below, may provide finer control over the specific federated GraphQL directives that may be automatically added to the schema, thus reducing conflicts by not automatically including federated GraphQL directives that are not needed.

Provided below is an example import mechanism that may be utilized in a federated subgraph schema:

```
extend schema
    @link(url: "https://specs.apollo.dev/federation/v2.0",
        import: ["@key", "@shareable"])
```

In implementations, a further federated approach, such as discussed more fully below, an import aliasing mechanism may also be introduced. In implementations, an import aliasing mechanism may be directed at avoiding conflict in circumstances in which a federated GraphQL directive is needed but an existing GraphQL directive with the same name was in prior use in an existing monograph schema prior to being upgraded to a federated subgraph schema. In implementations, an import aliasing mechanism may allow for renaming of a federated GraphQL directive name with an "as" modifier to avoid conflicts with existing GraphQL directives used in the same subgraph schema. Provided below is an example aliasing mechanism that may be utilized in a further federated approach, such as discussed more fully below. In the example below, an "as" modifier is utilized to rename an "@key" directive to "@primaryKey" to avoid potential conflict in a subgraph schema:

```
extend schema
    @link(url: "https://specs.apollo.dev/federation/v2.0",
        import: [{ name: "@key", as: "@primaryKey"}, "@shareable"])
```

The particular federated approach discussed above requires a relatively higher degree of consistency for shared value types (e.g., all types had to be exactly the same across subgraphs). A further federated approach, such as discussed more fully below, introduces an eventually consistent model such that value type changes (e.g., adding a field, etc.) may be made one subgraph at a time to support a new multi-team workflow for supergraph schema evolution. For example, an "@inaccessible" directive may be utilized on a new field in one subgraph to exclude a newly added field from the supergraph API schema that is directly accessible by clients and from the build-time validation of the theoretically possible queries of interest against the supergraph API schema. Subsequently, the new field may be added to other subgraphs one at a time on their own release schedule. Once the new field has been added to other subgraphs (e.g., one at a time), the "@inaccessible" directive may be removed to make the newly added field accessible in the supergraph API schema that is directly accessible by the clients.

An eventually consistent model introduced via a further federated approach may support additional multi-team workflows for supergraph schema evolution to add a new field to a shared value type in a single subgraph, but have it become immediately accessible in the supergraph API schema. For example, default values may be utilized for new fields in circumstances in which one of the subgraphs using a shared value type has not yet added a field. Other techniques of ensuring that new fields can be added one subgraph at a time rather than forcing all subgraphs to do a joint release that may be difficult to schedule and/or coordinate as may be the case with other approaches may also be introduced to support multi-team workflows for supergraph schema evolution, for example.

A further federated approach may also, as part of an eventually consistent model, for example, introduce new machine-readable composition hints (e.g., linter hints) that may be generated during composition to show subgraph divergence (e.g., inconsistencies) across graph types and fields definitions so that they may be observed and/or validated in a supergraph build pipeline and/or supergraph command line tooling with user-defined policies and/or build pipeline automation to validate and/or notify teams of potential issues, for example.

Via these example mechanisms, a further federated approach may provide additional flexibility (e.g., flexible type merging that may support eventually consistent types and/or field definitions across subgraphs and also more visibility and/or control via composition hints to effectively govern the additional flexibility).

A particular federated approach, such as discussed above, may utilize special GraphQL keywords (e.g., "extend") and/or directives (e.g., @external) to extend a federated entity type in subgraphs beyond the first subgraph in which the federated entity type was first defined (e.g., without "extend"). The use of "extend" in the particular federated approach requires deciding which subgraph should be the primary subgraph for a federated entity type (where the type is defined without the "extend" keyword) and which subgraphs should be the extending subgraphs for a federated entity type (e.g., with the use of the "extend" keyword to indicate additional subgraphs are extending a federated entity type). In contrast, a further federated approach, such as discussed herein, may not require such special keywords and/or directives to compose a graph, in implementations. A further federated approach may not require "extend" on any subgraphs such that federated entity types are shared equally by all subgraphs without the concept of a primary owner of a type (e.g., without the use of "extend" on a federated type definition) and without the concept of an extending subgraph (e.g., with the use of "extend" on a federated type definition), for example. This may improve the ergonomics for newer developers who may not have to learn about a new special "extend" keyword and for ongoing maintenance of a federated graph, such as wherein a previous primary owner of a federated entity type (e.g., often the first federated subgraph that originated from a monolithic graph) is no longer the primary owner due to an additional smaller subgraph becoming the primary owner. This may occur, for example, when breaking down a monolithic graph into smaller subgraph modules so an organization can grow their graph faster and/or enable more independent and autonomous team development on distinct subgraph modules.

Also, for example, a particular federated approach, such as discussed above, may not enforce a single source of truth for all fields. Rather, for example, a particular federated approach may allow for one subgraph to "@provide" a field that is otherwise provided by a different subgraph to denormalize the field for performance reasons without requiring other subgraph teams to agree which may result in inconsistent or incorrect data being returned for a given query. In contrast, a further federated approach such as discussed herein may provide and/or may enforce a single source of truth for all fields (e.g., by default) that may be relaxed with a "@shareable" directive to allow denormalization of fields across subgraphs for performance, for example, that may require all subgraph teams to agree that a particular field is "@shareable" in contrast to a particular federated approach discussed above wherein such safety mechanisms may not be provided. In the further federated approach, an enhanced shared-ownership model with improved multi-team collaboration properties may result from the combination of the equal ownership of federated entity types across all subgraphs, the single source of truth for all federated entity fields that can be relaxed with "@shareable", and/or a more flexible type merging model with support for incremental rollout of a new field on shared value types one subgraph at a time, for example.

As mentioned, a particular federated approach may allow a single subgraph to provide a Query root field that would be composed into the unified graph. Therefore, the query planner may always send the query for a given Query root field to the single and only subgraph that provided that Query root field in the unified graph and then may fetch additional fields from additional subgraphs using the entity types that may be fetched with "_entities" with an "@key" to join in the additional subgraph data. As discussed more fully below, a further federated approach may allow multiple subgraphs to provide the same Query root field and the further federated approach query planner may now be able to pick the most advantageous subgraph for the entry point of the query to minimize the number of subgraph fetches, for example.

For a further federated approach, such as an example approach discussed below, a number of object types and/or a number of layouts may be acceptable so long as they do not break the FPF. This means that, in implementations, for one or more particular subgraphs composed into a particular supergraph schema, any layout for the one or more particular subgraphs may be specified to be acceptable as long as queries of interest (e.g., queries based on particular supergraph schema API) can be served from the particular subgraphs. For example, given an object type T, and given any query path to T (e.g., wherein "query path" refers to a chain of fields on the supergraph schema API that starts from a root field and ends on a field of type T or a super-type of T), and additionally given a field f of T on the supergraph API, there exists a "subgraph query path" (e.g., a query plan) to fetch f.

Because for any particular supergraph schema there exists a finite number of types with a finite number of fields, and further because there exists a finite number of query paths (e.g., assuming cycles are broken), validating a particular supergraph schema under the further approach discussed below to ensure adherence to FPF may be computationally feasible.

Figure 5:
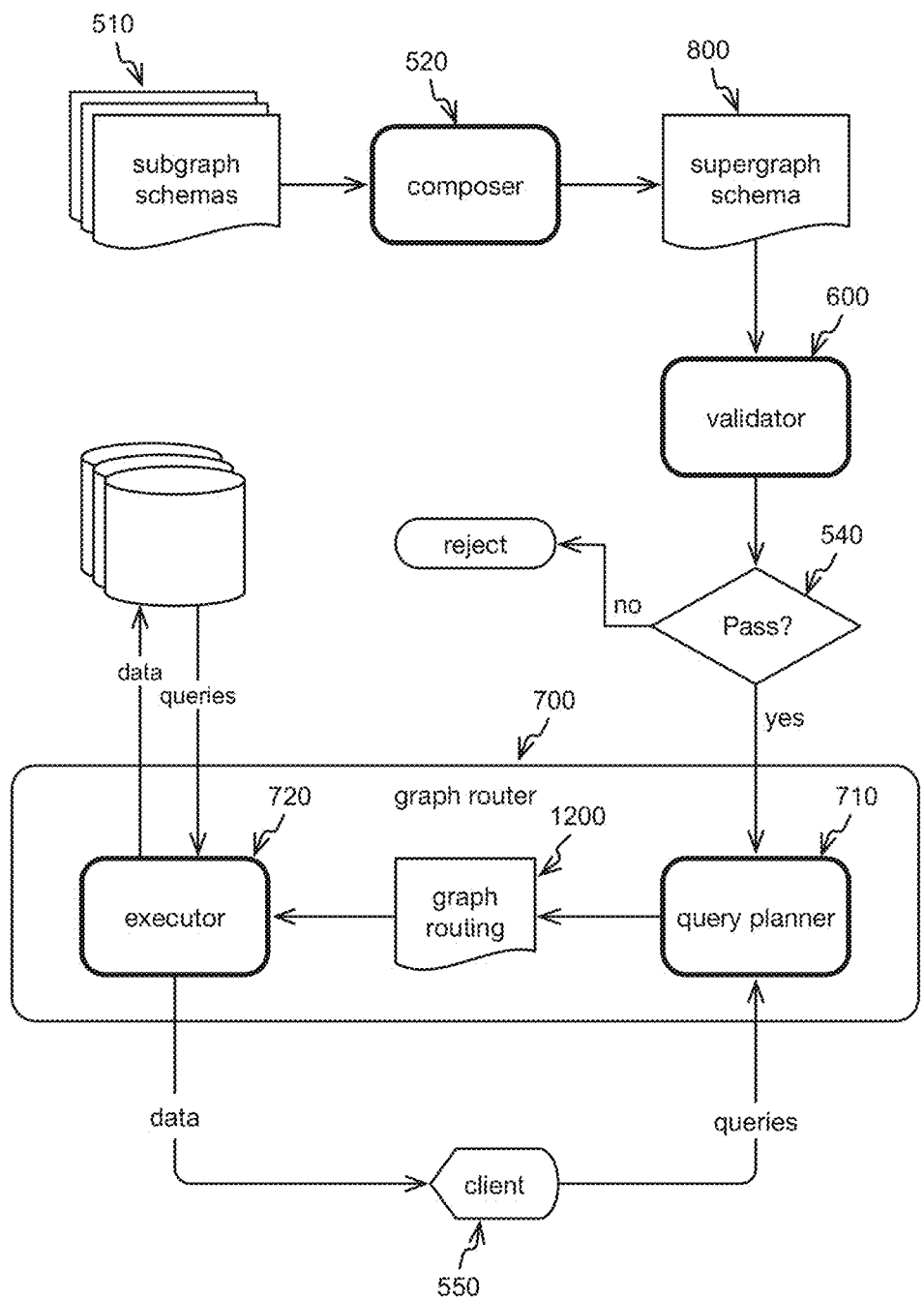
FIG. 5 is an illustration depicting a further federated approach.

For a further approach for federated graph utilization, such as depicted in FIG. 5, for example, composition rules, guidelines, etc. may be more relatively simple and/or relaxed (e.g., more flexible type merging, more flexible composition rules, etc.) for subgraph authors (e.g., end-users of composition) so that composition can succeed in more scenarios and/or to allow for improved schema evolution in multi-team environments, for example. In implementations, a further approach for federated graph utilization may include a generalized composition model based, at least in part, on the FPF that may support smaller incremental changes, more flexible value type merging and/or an improved shared ownership model, for example, as explained more fully below. As also explained more fully herein, a generalized composition model in support of the FPF, with its more flexible value type merging, improved shared ownership model and/or deeper static analysis/validation, in combination with the utilization of declarative graph composition into a static structure (e.g., subgraph schemas composed into a supergraph schema), may provide a number of benefits and/or advantages over other approaches, such as schema stitching and/or other approaches that may be authored in a specific programming language such as Javascript, that may be dynamically evaluated at runtime and that may therefore be more prone to errors. The benefits and/or advantages of the further federated approach may include, for example, an ability to statically analyze a supergraph schema at build time to catch errors sooner, thereby enabling an ecosystem of supergraph tooling that may lint, validate, transform and/or otherwise process a supergraph schema in CI/CD pipelines and/or may send notifications and/or generate reports by which the correctness of a supergraph schema may be validated and/or ensured before it may be delivered to a fleet of GraphQL routers processing client queries at scale, for example.

As mentioned, implementations (e.g., based at least in part on a further federated approach to graph utilization) may include declarative composition into a static artifact (e.g., composing subgraph schema into a supergraph schema) that may be statically analyzed at or near build time instead of just at runtime. Such implementations may allow development teams and/or groups of development teams in a company, for example, to further ensure correctness and/or safety of a composed supergraph at build time in an achievable and bounded way, for example. In contrast, with a schema stitching approach, it may be difficult and/or nearly impossible to validate schema stitching code because it is based on a general programming model instead of a more bounded declarative model that results in a single, statically analyzable federated GraphQL schema, for example.

FIG. 5 is an illustration depicting an embodiment 500 of a process demonstrating a further approach for federated graph utilization. Embodiments may include all of the operations, processes, techniques, approaches, etc. described, fewer than the operations, processes, techniques, approaches, etc. described, and/or more than the operations, processes, techniques, approaches, etc. described for example process 500. Likewise, it should be noted that content acquired or produced, such as, for example, input signals, output signals, operations, results, etc. associated with the example provided may be represented via one or more analog and/or digital signals and/or signal packets. It should also be appreciated that even though one or more operations, processes, techniques, approaches, etc. are illustrated or described concurrently or with respect to a certain sequence, other sequences or concurrent operations processes, techniques, approaches, etc. may be employed. Further, it should be noted that operations, processes, techniques, approaches, etc. may be implemented, performed, etc. by any combination of hardware, firmware and/or software. In addition, although the description below references particular aspects and/or features illustrated in certain other figures, one or more operations, processes, techniques, approaches, etc. may be performed with other aspects and/or features.

Figure 8:
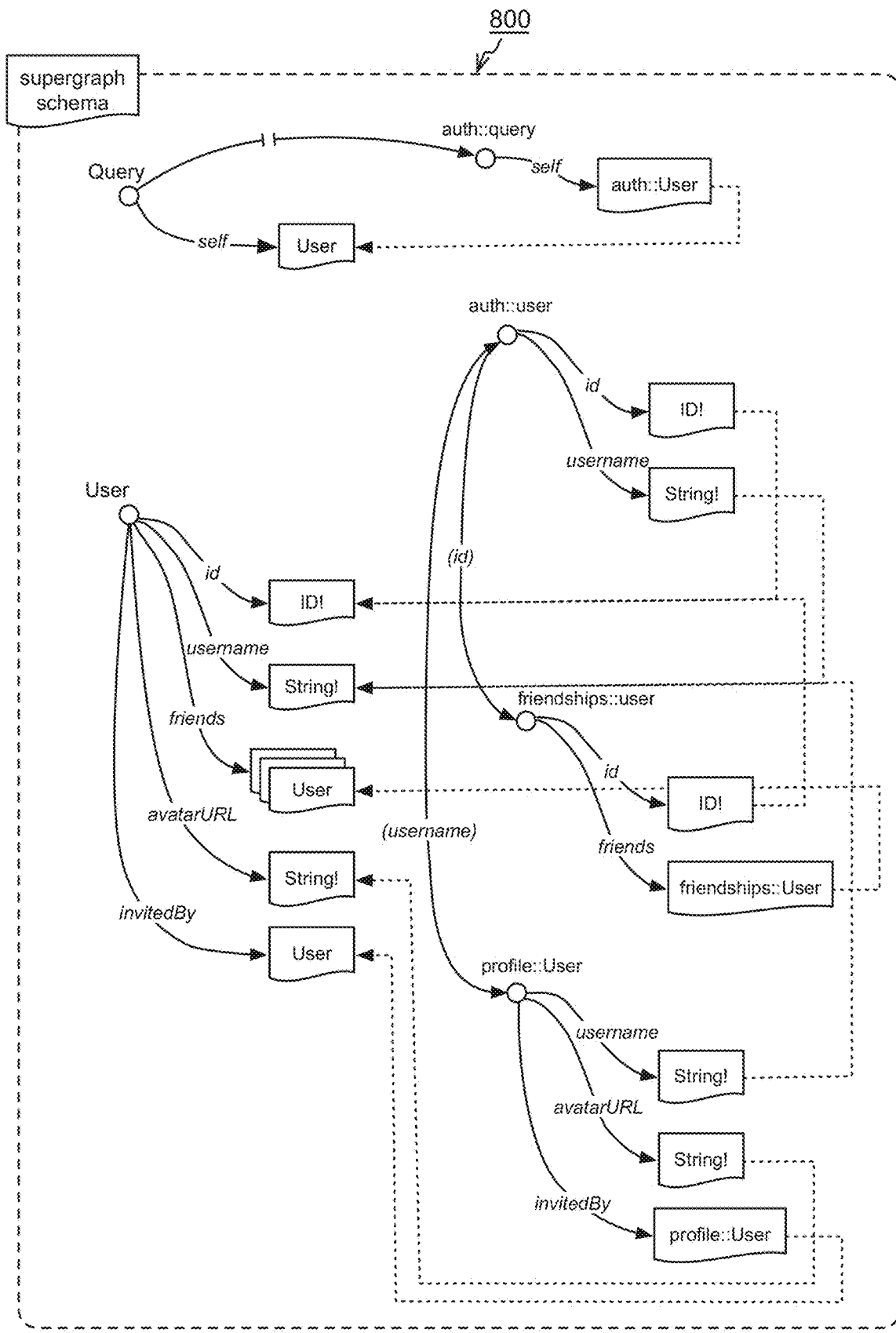
FIG. 8 depicts an example supergraph.

In an implementation, a composer process, such as composer 520, may obtain graph schemas, such as subgraph schemas 510, for one or more services and/or may generate a new unified graph schema, such as supergraph schema 800, that may join content from the individual subgraph schemas. An example supergraph schema 800 is depicted in FIG. 8. Also, in an implementation, a validator process, such as validator process 600, may operate on supergraph schema 800 and/or may ensure that a graph routing exists for theoretically possible queries of interest (e.g., one or more theoretically possible queries, all theoretically possible queries, etc.) against supergraph schema 800. In other words, in an implementation, validator 600 may ensure that theoretically possible supergraph queries of interest can be satisfied by routing content (e.g., data) between queries against one or more subgraphs, for example. As depicted at block 540 of example process 500, supergraph schema 800 may be rejected should it fail validator process 600. As also indicated at block 540, should supergraph schema 800 pass validator process 600, supergraph schema 800 may be provided to a graph router process, such as graph router 700.

In implementations, a validator process, such as validator 600, may be optional. However, if an implementation lacks a validator process that operates at or near build-time, for example, a router process, such as graph router 700, may not discover that a query cannot be successfully routed until runtime, responsive to a query being obtained from a front-end application, for example. Such circumstances may result in user-facing errors. For an implementation with a validator process performed at or near build-time, for example, such errors may be discovered prior to deployment, thereby improving service reliability and/or improving user experiences. For example, changes to subgraphs may originate at individual developer's computing devices (e.g., laptops). In implementations, validator processes may be performed on the individual developer's computing devices and this allows validation of subgraph changes relatively very early in the development process. Validation processes, such as validator process 600, are described in more detail below.

Figure 12:
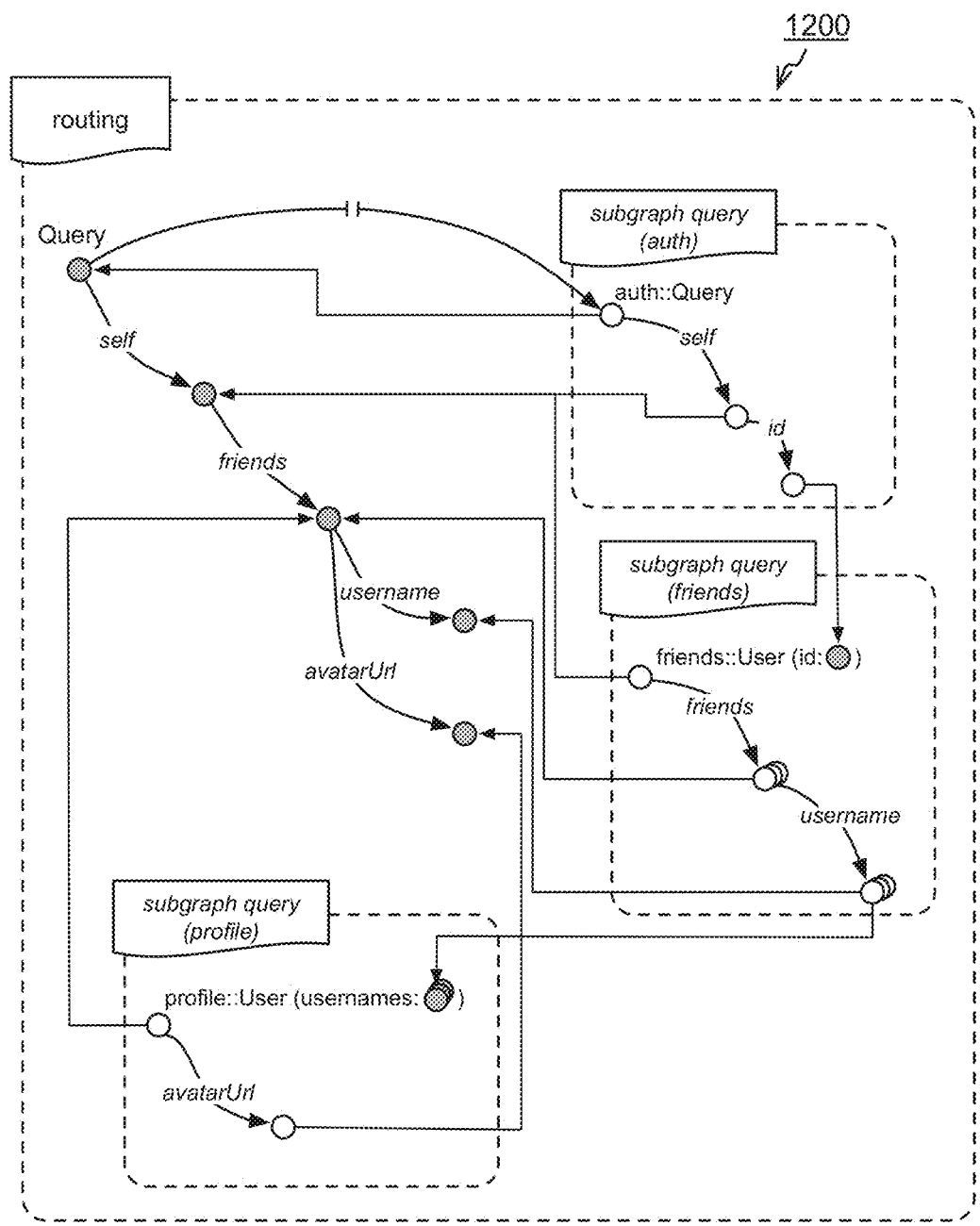
FIG. 12 depicts an example completed graph routing for an example query.

Again referring to example process 500, a graph router process, such as graph router process 700, may obtain a supergraph schema, such as supergraph schema 800. Graph router process 700 may accept queries from client computing devices, such as client computing devices 550, and/or may return results to client computing devices, for example. In implementations, graph router process 700 may include a query planner process, such as query planner process 710, and/or may include an executor process, such as executor process 720. In an implementation, query planner process 710 may obtain an incoming query from a client computing device 550 and/or may utilize knowledge of a supergraph schema, such as supergraph schema 800, to construct a graph routing, such as graph routing 1200, which may comprise a data structure specifying a set of subgraph queries and/or describing a flow of content between subgraph queries so that content requested by a query can be correctly located, for example. Also, in an implementation, executor process 720 may obtain a routing, such as graph routing 1200, and/or may execute the graph routing to perform subgraph queries and/or to route content between the queries. An example graph routing 1200 is depicted in FIG. 12, discussed more fully below.

Referring again to FIG. 5, composer process 520 may obtain subgraph schemas 510 and/or may generate supergraph schema 800 based at least in part on subgraph schemas 510, for example. In an implementation, a supergraph schema, such as supergraph schema 800, may have particular example characteristics and/or properties. For example, in an implementation, types within a supergraph schema, such as supergraph schema 800, may join one or more subgraph types. Further, for example, individual fields within a supergraph schema, such as supergraph schema 800, may refer to fields within one or more subgraphs, such as subgraphs 510. Also, in an implementation, a supergraph schema, such as supergraph schema 800, may define a "join graph" that may associate individual supergraph fields with one or more subgraph fields which can resolve the data. In an implementation, subgraph fields may return different types and/or may contain different scalar content than the supergraph type to which they are joined. Further, in an implementation, it may be the responsibility of a validator process, such as validator process 600 described below, to ensure that such type conversions are valid.

In an implementation, a composer process, such as composer 520, may apply a join policy to construct a supergraph schema, such as supergraph schema 800. A join policy may determine the shape of a join graph, for example. A join policy's format may be implementation-dependent and/or may generally depend on a particular encoding of a graph. For example, if an encoding gives names to types and/or fields, a join policy might attempt to join subgraph types that may have the same name, in an implementation.

Figure 6:
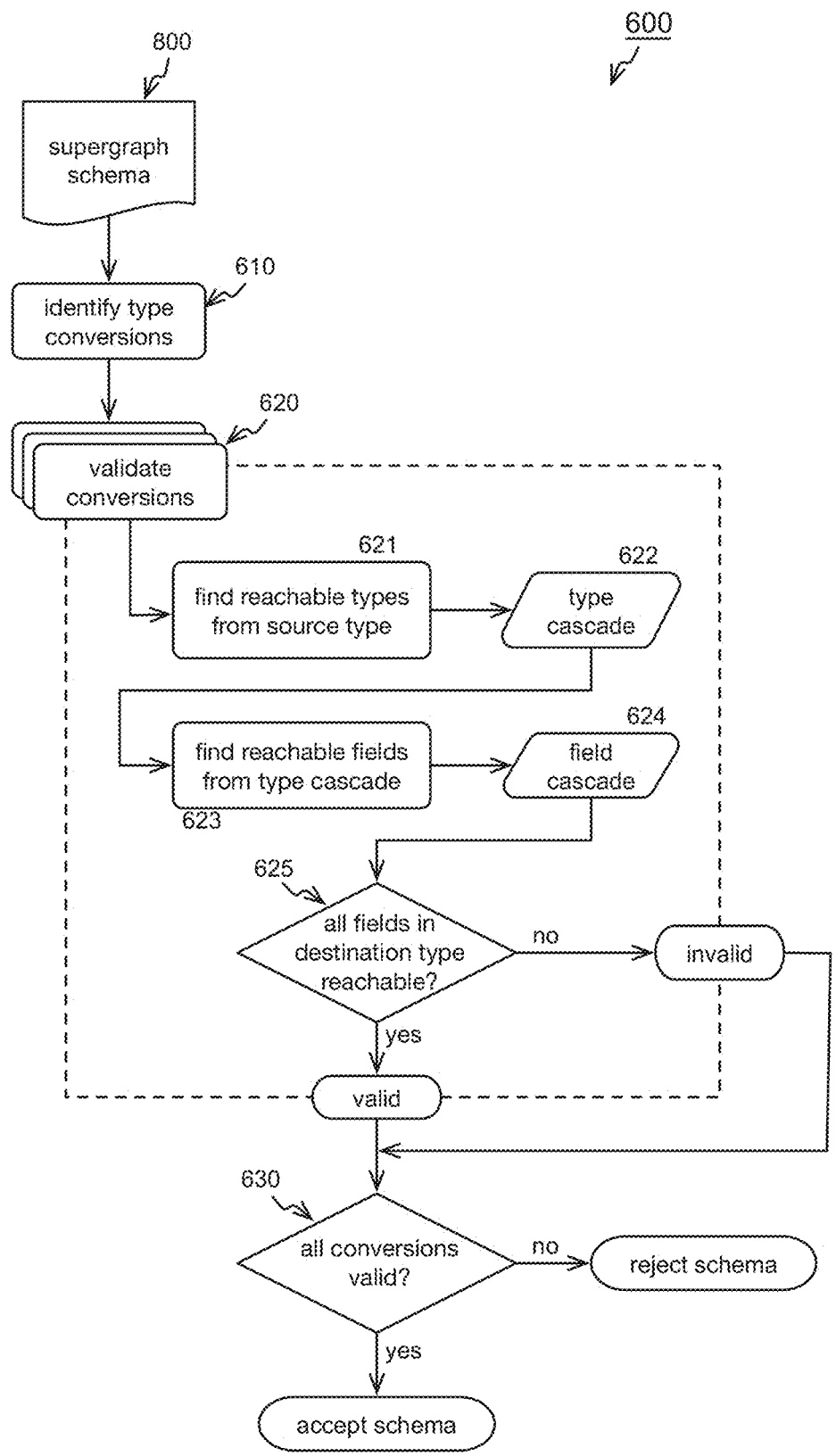
FIG. 6 depicts an example validator process.

FIG. 6 depicts an embodiment 600 of an example validator process. In an implementation, validator process 600 may take a supergraph schema, such as supergraph schema 800, and/or may ensure that a routing exists for possible queries against the supergraph schema. Embodiments may include all of the operations, processes, techniques, approaches, etc. described, fewer than the operations, processes, techniques, approaches, etc. described, and/or more than the operations, processes, techniques, approaches, etc. described for example process 600. Likewise, it should be noted that content acquired or produced, such as, for example, input signals, output signals, operations, results, etc. associated with the example provided may be represented via one or more analog and/or digital signals and/or signal packets. It should also be appreciated that even though one or more operations, processes, techniques, approaches, etc. are illustrated or described concurrently or with respect to a certain sequence, other sequences or concurrent operations processes, techniques, approaches, etc. may be employed. Further, it should be noted that operations, processes, techniques, approaches, etc. may be implemented, performed, etc. by any combination of hardware, firmware and/or software. In addition, although the description below references particular aspects and/or features illustrated in certain other figures, one or more operations, processes, techniques, approaches, etc. may be performed with other aspects and/or features.

In implementations, validator process 600 may ensure that a valid routing exists for theoretically possible queries of interest (e.g., one or more theoretically possible queries, all theoretically possible queries, etc.) against a supergraph, such as supergraph schema 800. In implementations, theoretically possible queries of interest may include, for example, queries that may be formed in accordance with a supergraph API schema. That is, queries that may be generated by a client, based at least in part on a supergraph API schema accessible to the client, for example, may be tested against a supergraph schema, such as supergraph schema 800, to determine whether the queries can be satisfied. As mentioned previously, a supergraph API schema may resemble a supergraph schema, such as supergraph schema 800, in some respects, but types, fields, and/or directives that may be considered "machinery" may be omitted and may not be part of a public-facing API, for example. In implementations, a supergraph API schema may expose a gateway to clients who may not need to know any internal implementation details about a particular supergraph, for example.

As depicted in FIG. 5, and as discussed above, a validator process, such as validator process 600, may be performed prior to deploying a supergraph schema, thereby ensuring that a routing exists for theoretically possible queries of interest against a particular supergraph schema, such as supergraph 800 schema, prior to graph routing operations and/or prior to runtime operations for client applications. For example, validation operations may be performed during build-time (e.g., rather than at run-time). In implementations, by performing validation operations relatively early in a development/deployment cycle, a number of possible advantages may be realized. For example, by performing supergraph validation operations at build-time (e.g., responsive to composition process 520 and/or prior to graph router process 700), any detected problems may be resolved with relative ease and/or with relatively little expense in time and/or resources. For example, if one or more particular subgraphs contribute to composition of a supergraph schema that is not able to satisfy one or more theoretically possible queries of interest, adjustments may be made to the one or more particular subgraphs and the supergraph schema may be composed anew. In contrast, implementations lacking such a validation process performed at build-time, or at least at some point prior to deployment, may incur significant expenses in time, resources, downtime, etc. to detect and/or correct issues as they arise during run-time (e.g., during client operations).

For a generalized composition model described herein as part of a further federated approach to graph utilization, in accordance with the fundamental property of federation (FPF), for example, a composed supergraph, such as supergraph schema 800, may be determined to be valid responsive at least in part to theoretically possible queries of interest (e.g., one or more theoretically possible queries of interest, all theoretically possible queries of interest, etc.) for the composed supergraph being determined to be serviceable via one or more subqueries on one or more subgraphs, for example. In implementations, such validation operations may be performed (e.g., during build time) by building a merged graph that may connect subgraph schemas and that may encode possible query paths between subgraphs. That same merged graph may be used during query planning, such as via query planner process 710, to build an advantageous query plan for a particular query, for example.

In implementations, a validator process, such as validator process 600, may include, for example, identifying type conversions within a particular supergraph schema, such as supergraph schema 800, as indicated at block 610. For example, edges of supergraph schema 800 having source and destination types that are not identical may be collected in a join graph. Further, as depicted at block 620, individual type conversions (e.g., [source type, destination type]) previously identified and/or collected at block 610 may be validated. Type conversion validation operations for block 620 may include operations depicted at blocks 621, 622, 623, 624 and/or 625, for example, as depicted in FIG. 6.

In implementations, type conversion operations 620 may be repeated until the type conversions identified at block 610 have been processed. As depicted at blocks 621 and/or 622, one or more reachable types may be collected (e.g., located, identified, determined, etc.) from a source type for a current type conversion at least in part by traversing the supergraph schema's join graph, for example. In implementations, as depicted at blocks 623 and/or 634, validation operations 620 may further include finding one or more reachable fields from a current source type at least in part by collecting (e.g., locating, identifying, determining, etc.) fields associated with types discovered in the previous reachable type traversal depicted at blocks 621 and/or 622, for example. In implementations, a determination may be made as to whether fields of interest (e.g., one or more fields, all fields, etc.) in a destination type are included in a set of reachable fields. See, for example, block 625. In an implementation, if all fields of interest in destination type are contained in the set of reachable fields determined at blocks 623 and/or 624, for example, the present type conversion may be determined to be valid. Otherwise, the current type conversion may be identified as invalid.

Further, as depicted at block 630, for circumstances in which type conversions of interest processed at block 620 (e.g., all type conversions processed at block 620) are determined to be valid, the supergraph schema (e.g., supergraph schema 800) may be identified as valid. Should one or more type conversions be determined to be invalid at block 620, the supergraph schema may be identified as invalid, for example.

Example validator processes, approaches, operations, etc. may provide more granular, user-friendly output than a simple pass/fail, in implementations. For example, validator processes, such as validator process 600, may suggest schema changes, such as changes to one or more subgraph schemas, that may produce a valid supergraph schema. In an implementation, validator process 600 may generate a new, valid supergraph schema by eliminating one or more unresolvable fields, for example. Of course, subject matter is not limited in scope in this respect.

Figure 7:
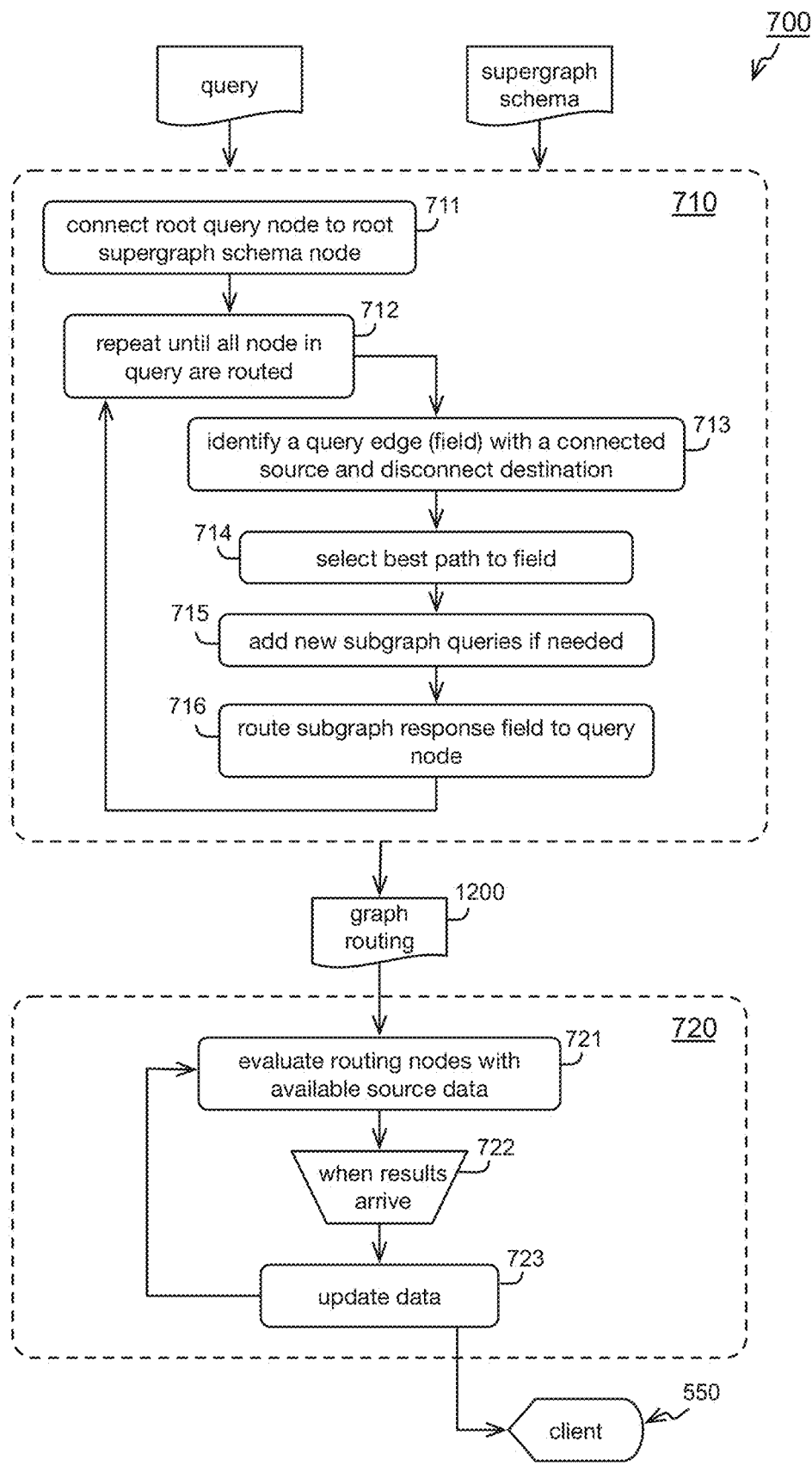
FIG. 7. Illustrates an example graph router process including example query planner and/or executor operations.

FIG. 7. Illustrates an embodiment 700 of an example graph router process, including an embodiment 710 of an example query planner process and/or an embodiment 720 of an example executor process. Graph router process 700 was first introduced above in connection with FIG. 5. Embodiments may include all of the operations, processes, techniques, approaches, etc. described, fewer than the operations, processes, techniques, approaches, etc. described, and/or more than the operations, processes, techniques, approaches, etc. described for example process 700. Likewise, it should be noted that content acquired or produced, such as, for example, input signals, output signals, operations, results, etc. associated with the example provided may be represented via one or more analog and/or digital signals and/or signal packets. It should also be appreciated that even though one or more operations, processes, techniques, approaches, etc. are illustrated or described concurrently or with respect to a certain sequence, other sequences or concurrent operations processes, techniques, approaches, etc. may be employed. Further, it should be noted that operations, processes, techniques, approaches, etc. may be implemented, performed, etc. by any combination of hardware, firmware and/or software. In addition, although the description below references particular aspects and/or features illustrated in certain other figures, one or more operations, processes, techniques, approaches, etc. may be performed with other aspects and/or features.

Figure 9:
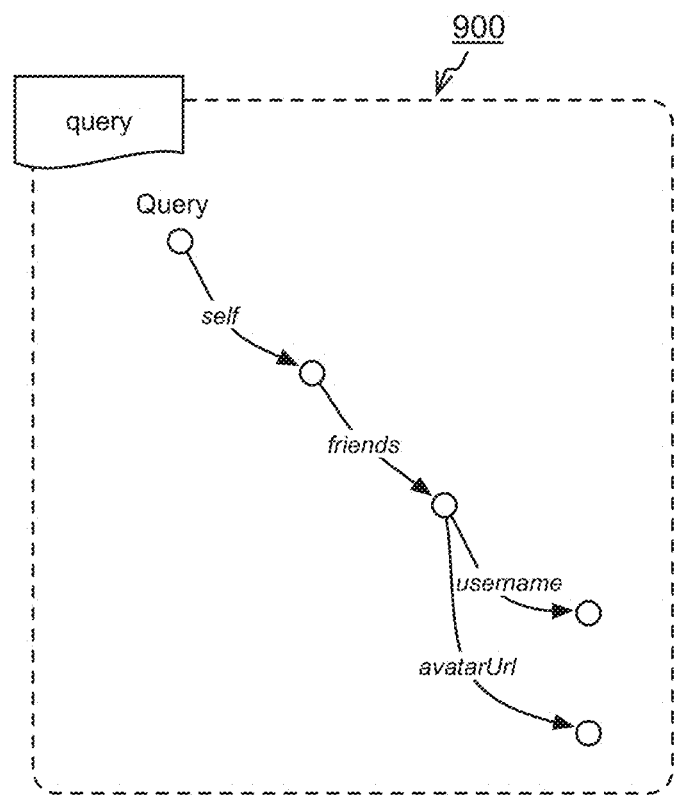
FIG. 9 depicts an example query.

In an implementation, graph router process 700 may be responsible for loading a supergraph schema, such as supergraph schema 800, preparing to process incoming queries from client computing devices, such as client computing devices 550, and/or processing queries received from client computing devices. In implementations, queries may start at a root selection, associated with a root type, and may describe a partial traversal of a supergraph schema by identifying which fields to traverse, for example. FIG. 9, for example, depicts an example query 900 showing a partial traversal of supergraph schema 800. Supergraph schema 800 is depicted in FIG. 8.

In an implementation, query planner 710 of graph router process 700 may obtain supergraph schema 800, may obtain query 900, and/or may generate graph routing 1200, for example. As depicted in FIG. 7, query planner process 710 may include connecting a root query node to a root supergraph schema node, as depicted at block 711, for example. That is, for example, a root query node may be connected to a root supergraph type. A traversal may thus begin with a single connected query node, in implementations.

In implementations, as indicated at block, 712, operations shown at blocks 713, 714, 715, and/or 716 may be repeated until nodes of interest for a query (e.g., one or more nodes of a query, all nodes of a query, etc.) have been routed. That is, blocks 713, 714, 715, and/or 716 may be repeated until nodes of interest in a query are connected to content (e.g., data), for example. In implementations, query planner process 710 may include identifying a query edge (e.g., field) with a connected source and disconnected destination which may comprise an unspecified field, for example, as indicated at block 713. Various implementations may utilize different policies to explore a graph, for example.

Figure 10:
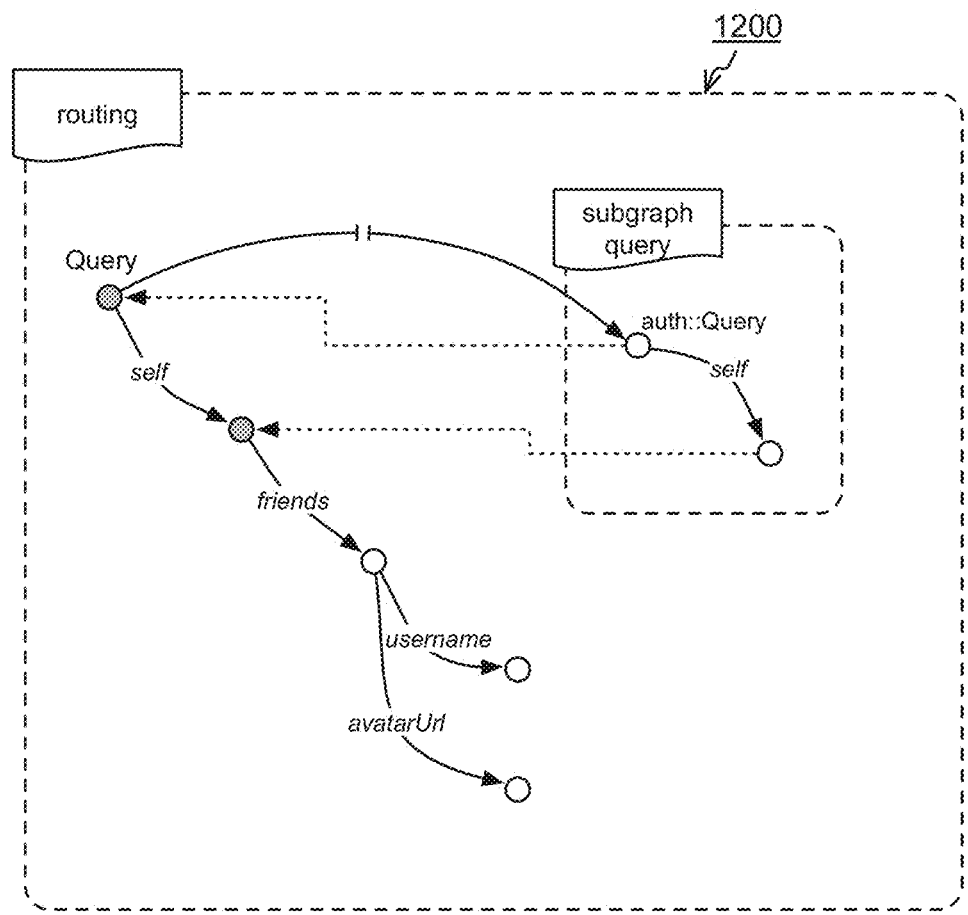
FIG. 10 depicts an example first-level graph routing for an example query.
Figure 11:
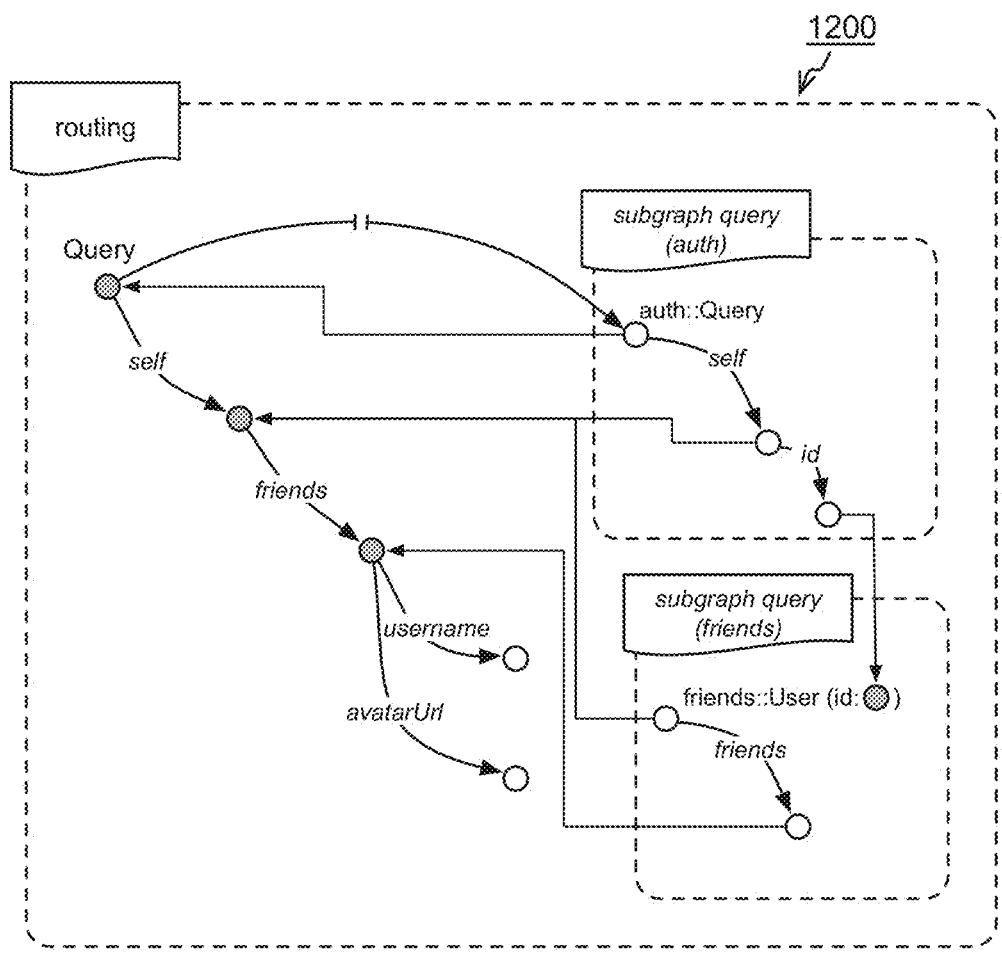
FIG. 11 depicts an example cross-subgraph routing for an example query.

As further indicated at block 714, a query path (e.g., an advantageous and/or best query path) to the destination field may be identified and/or selected. For example, a query path may be identified at least in part by traversing a type graph. See, for example, FIG. 9. In implementations, should multiple query paths be available, query planner 710 may refer to additional policy information and/or cost data to determine which query path to follow, for example. Also, in implementations, new subgraph queries may be added if needed and/or if advantageous, as depicted at block 715. That is, should a query path require one or more subgraph queries that are not already present in the graph routing, such subgraph queries may be added, for example. In implementations, should added queries specify content (e.g., data), the queries may be connected to appropriate content sources in other subgraph queries. See, for example, FIG. 10 depicting an example partial routing 1200 of supergraph schema 800 based at least in part on example query 900. Also, as depicted at block 716, a subgraph response field may be routed to the query node. See, for example, FIG. 11 depicting a further partial routing 1200 of supergraph schema 800. As mentioned, such processing may continue until all nodes in the query at interest (e.g., query 900) are routed. As mentioned, a graph routing, such as graph routing 1200, may comprise a data structure specifying a set of subgraph queries and/or describing a flow of content between subgraph queries so that content requested by a query can be correctly located and provided to a client, for example.

In implementations, the same root query may exist in multiple subgraphs. Further, for example, query planner process 710 may select a particular subgraph to initiate a root query, in implementations. For example, query planner process 710 may select a particular subgraph to initiate a root query to reduce the subgraph fetch count, although subject matter is not limited in scope in this respect.

Further, in implementations, for a further federated approach such as described herein, for example, a query planner, such as query planner process 710, may hop across subgraphs to resolve value type fields. Also, in implementations, a further federated approach may support future additional bridging across subgraphs, such as in accordance with a generalized composition model implemented to support the FPF.

For example, as mentioned, a further federated approach may utilize more flexible type merging, more flexible composition rules, etc., so that supergraph schema composition can succeed in more scenarios. It may be noted that, for particular implementations, specific value types, entities and/or root types may not be specified. In implementations, root types may comprise an entry point for a query, for example. In a particular federated graph approach, such as discussed above, restraints on particular layouts for such types may be enforced in a relatively restrictive fashion. In the particular federated approach, only a single subgraph may provide a given query root type field that may be composed into a unified supergraph schema such that the query planner may be prompted to utilize the single subgraph that provided an entry point for a query on that query root field, where it may then fetch additional fields from additional subgraphs as needed. However, a further federated approach, such as a further federated approach discussed herein, may allow multiple subgraphs to provide the same query root field so that the query planner may advantageously select an advantageous (e.g., best) subgraph for the entry point of a query to reduce (e.g., minimize) the number of subgraph fetches. Particular layouts for such types may influence what kind of supergraph query paths may be possible for other types, for example. Further, in implementations, with respect to entities, their keys may allow query paths to cross between subgraphs, effectively yielding more flexibility. Note also that other types of bridges may be added later, including unidirectional bridges, for example, and a further federated approach such as described herein may account for such additional bridges, in implementations.

As mentioned, a successful graph routing, such as graph routing 1200, may comprise a data structure specifying a route to content for individual nodes of interest of a query (e.g., all nodes of a query), in implementations. Further, various implementations may utilize various encodings for this data structure, such as to facilitate inspection and/or serialization, for example. In implementations, a graph routing, such as graph routing 1200, may be represented in a language-specific data structure that may be executed, for example.

Referring again to FIG. 7, an executor process, such as executor process 720, may obtain a graph routing, such as graph routing 1200, and/or may perform specified queries and/or data flow operations in order to resolve content for the specified queries. Executor processes, such as executor process 720, may be implemented in a variety of ways, depending at least in part on a particular graph routing shape. In implementations, executor process 720 may be performed in accordance with the example tasks. In implementations, as depicted at block 721, ready nodes may be evaluated. For example, routing nodes (e.g., subgraph query nodes and/or processing nodes) having content (e.g., data) that they specify to be able to be evaluated may be scheduled for evaluation (e.g., by dispatching a request to a subgraph, by scheduling data processing within the system, etc.).

Further, as depicted at blocks 722 and 723, responsive at least in part to obtaining results from evaluations of routing nodes at block 721, executor process 720 may send one or more content updates to a client computing device, such as client computing device 550 if new well-formed client-facing content is available and/or may send one or more updates of available content within the routing, in implementations. Also, in implementations, operations indicated at blocks 721-723 may be repeated to evaluate nodes (e.g., one or more nodes, all nodes, etc.) that are now able to run.

As mentioned, FIG. 8 depicts an example supergraph 800. FIGS. 9-12 depict an illustration demonstrating the building-up of an example graph routing 1200 pertaining to example supergraph 800. Of course, FIGS. 8-12 merely depict an example and subject matter is not limited in scope in these respects.

In implementations, composed supergraphs may apply various algorithms in graph traversal and/or may apply formal type systems to address the issue of aggregating a diverse variety of content stores with potentially different schematic representations into a single data layer with no obvious seams.

Implementations utilizing federated approaches, such as described herein, may provide advantages over other approaches. For example, schema stitching technologies may connect graphs in an ad-hoc manner. Such technologies may be flexible, but correctness can suffer. For example, it may be difficult or impossible to statically verify that stitched graphs are correct and/or to verify that all queries on the stitched graph can be resolved. In contrast, implementations involving federated approaches, such as those described herein, for example, may provide statically verifiable correctness.

With other technologies and/or approaches, it may also be possible to represent organizational content in a hierarchical way (e.g. with multiple REST services) and/or to join them in a hierarchical way. Such approaches may guarantee that queries are resolvable. However, such approaches may not permit joining and/or merging content from subservices. For example, there may be no way for a profileData service to add a field (e.g., avatarUrl) to content returned by another service. Therefore, in such circumstances, the underlying architecture of subservices may thus be apparent to the users. This is in contrast to implementations involving federated approaches, such as those described herein, wherein joining and/or merging of content from subservices may be permitted and/or wherein the underlying architecture of subservices may not be apparent to users.

An additional advantage that may be provided by implementations involving federated approaches such as those described herein may be provided by a query planner process, such as query planner process 710 described above in connection with FIG. 7. For example, a planner process may be able to leverage knowledge of both a joined supergraph schema and an incoming query to perform global optimizations, such as fetching content from a number of subservices, for example.

In implementations, the composer, validator, graph router, planner, and/or executor operations may be specified as separate components. However, implementations may take a variety of approaches to providing their functionality. For example, in implementations, processes, approaches, components, etc. may be performed as separate processes, approaches, components, etc. and/or in the same process and/or component. Also, in implementations, processes, approaches, components, etc. may be performed on separate machines, on the same machine, etc.

Additionally, in implementations, processes, approaches, components, etc. may be performed in sequence or in parallel or in some combination. For example, an implementation may conflate composition and validation into a single function which may begin with a valid (empty) supergraph and/or may ensure it remains valid as subgraphs are composed (e.g., piece by piece). Also, for example, a graph router process may, in an implementation, conflate a query planner process and an executor process, issuing subgraph queries before a full graph routing has been discovered. Further, in an implementation, a graph router implementation may embed a composer and a validator within the same process. Of course, these are merely examples of how processes, approaches, components, etc. may be combined and subject matter is not limited in scope in this respect.

Implementations that may conflate components may not have cause to emit intermediate artifacts, for example. However, content expressed by such intermediate artifacts may still be present in the system. For example, graph router implementations that may embed a composition process may not produce a document representing a supergraph schema. However, a supergraph schema may find utility in servicing incoming queries, and some representation of a supergraph schema, perhaps lazily-evaluated, may be present internally within the graph router, in an implementation. Also, for example, graph router implementations that may conflate planning and execution processes may not produce a document describing a graph routing. A graph routing may still be advantageous and may be present in a graph router, perhaps in a more implicit form, built from bedrock language data structures (e.g., such as javascript's promise chains), for example. Such a form may, nevertheless, comprise a graph routing, in an implementation.

The further federated approach described herein (e.g., in connection with FIGS. 5-12) may provide a relatively more eventually consistent model where type definitions may diverge and be more flexibly merged back together with relaxed composition rules that may allow tens or even hundreds of subgraph teams to collaborate more asynchronously and with reduced release coordination as compared with other approaches, including other federated approaches, such as other federated approaches that may require relatively highly consistent value type definitions (e.g., without @key) across subgraphs where all subgraphs may identify definitions and make changes in lockstep.

To help manage such additional flexibility, for example, implementations may support composition hints that may surface divergences in value type definitions across subgraphs that may result in query planning hopping across subgraphs to fetch fields on value types through whatever "join path" exists in the supergraph schema (e.g., utilizing "@key" on associated entity types to hop across subgraphs). Such an approach may allow value types to be more incrementally evolved one subgraph at a time, for example, with relaxed composition (more flexible value type merging) that may help ensure that subgraph teams don't need to perform a large, coordinated release across multiple teams rather than deploying autonomously and/or independently, for example.

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to cooperate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, MD, 21050-2747), but may include other aspects, such as the Hadoop distributed file system (HDFS) (available from the Apache Software Foundation, 1901 Munsey Drive, Forrest Hill, MD, 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a graph router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 13:
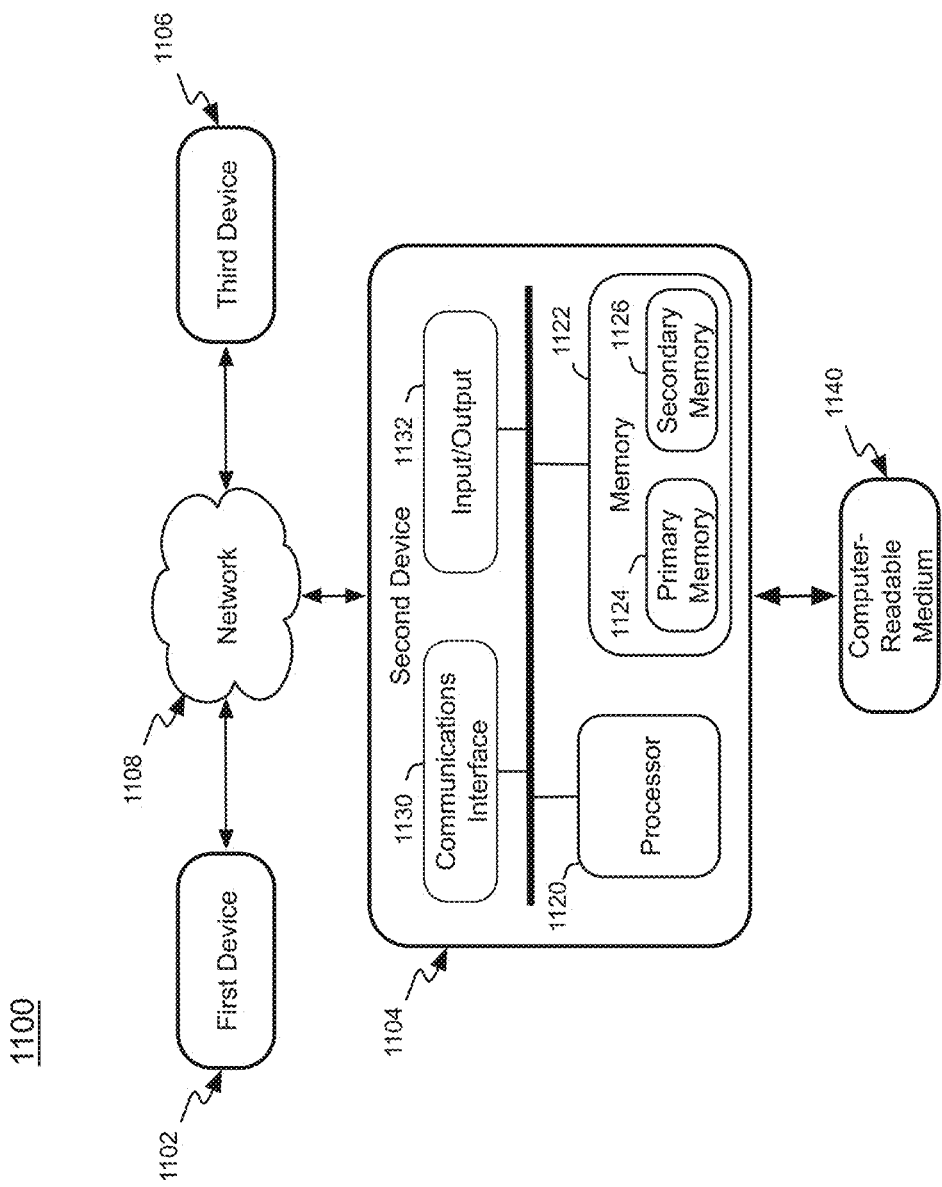
FIG. 13 depicts a schematic diagram illustrating an implementation of an example computing environment.

In one example embodiment, as shown in FIG. 13, a system embodiment may comprise a local network (e.g., device 1104 and medium 1140) and/or another type of network, such as a computing and/or communications network. For purposes of illustration, therefore, FIG. 13 shows an embodiment 1100 of a system that may be employed to implement either type or both types of networks. Network 1108 may comprise one or more network connections, links, processes, services, applications, and/or resources to facilitate and/or support communications, such as an exchange of communication signals, for example, between a computing device, such as 1102, and another computing device, such as 1106, which may, for example, comprise one or more client computing devices and/or one or more server computing device. By way of example, but not limitation, network 1108 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 13 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1-10 and in the text associated at least with the foregoing figure(s) of the present patent application.

Referring now to FIG. 13, in an embodiment, first and third devices 1102 and 1106 may be capable of rendering a graphical user interface (GUI) for a network device and/or a computing device, for example, so that a user-operator may engage in system use. Device 1104 may potentially serve a similar function in this illustration. Likewise, in FIG. 13, computing device 1102 ('first device' in figure) may interface with computing device 1104 ('second device' in figure), which may, for example, also comprise features of a client computing device and/or a server computing device, in an embodiment. Processor (e.g., processing device) 1120 and memory 1122, which may comprise primary memory 1124 and secondary memory 1126, may communicate by way of a communication bus 1115, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, sensor content, etc. in the form of signals and/or states. Thus, a computing device, in the context of the present patent application, may comprise hardware, software, firmware, or any combination thereof (other than software per se). Computing device 1104, as depicted in FIG. 13, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, endpoint and/or sensor nodes, gateway devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, sensor content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 13, computing device 1102 may provide one or more sources of executable computer instructions in the form physical states and/or signals (e.g., stored in memory states), for example. Computing device 1102 may communicate with computing device 1104 by way of a network connection, such as via network 1108, for example. As previously mentioned, a connection, while physical, may not necessarily be tangible. Although computing device 1104 of FIG. 13 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1122 may comprise any non-transitory storage mechanism. Memory 1122 may comprise, for example, primary memory 1124 and secondary memory 1126, additional memory circuits, mechanisms, or combinations thereof may be used. Memory 1122 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1122 may be utilized to store a program of executable computer instructions. For example, processor 1120 may fetch executable instructions from memory and proceed to execute the fetched instructions. Memory 1122 may also comprise a memory controller for accessing device readable-medium 1140 that may carry and/or make accessible digital content, which may include code, and/or instructions, for example, executable by processor 1120 and/or some other device, such as a controller, as one example, capable of executing computer instructions, for example. Under direction of processor 1120, a non-transitory memory, such as memory cells storing physical states (e.g., memory states), comprising, for example, a program of executable computer instructions, may be executed by processor 1120 and able to generate signals to be communicated via a network, for example, as previously described. Generated signals may also be stored in memory, also previously suggested.

Memory 1122 may store electronic files and/or electronic documents, such as relating to one or more users, and may also comprise a computer-readable medium that may carry and/or make accessible content, including code and/or instructions, for example, executable by processor 1120 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 11, processor 1120 may comprise one or more circuits, such as digital circuits, to perform at least a portion of a computing procedure and/or process. By way of example, but not limitation, processor 1120 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1120 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 13 also illustrates device 1104 as including a component 1132 operable with input/output devices, for example, so that signals and/or states may be appropriately communicated between devices, such as device 1104 and an input device and/or device 1104 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising:
generating, utilizing at least one processor and a memory of a computing device, a particular supergraph schema based at least in part on a plurality of statically composed GraphQL subgraph schemas; and
determining, at build time utilizing the at least one processor, whether one or more graph routings exist for individual queries of interest of a plurality of queries of interest against the particular supergraph schema, including:
identifying one or more type conversions and/or determining one or more edges in the particular supergraph schema wherein source and destination types are not identical;
validating the one or more identified type conversions between one or more source types and one or more destination types, including discovering one or more reachable types from the one or more source types and finding one or more reachable fields from the one or more source types at least in part via collecting one or more fields associated with the one or more discovered reachable types; and
specifying that the particular supergraph schema is valid responsive at least in part to successful validation of the one or more identified type conversions.

2. The method of claim 1, wherein the generating the particular supergraph schema comprises enabling a plurality of root query graph routings wherein more than one of the plurality of statically composed GraphQL subgraph schemas include a root query node.

3. The method of claim 1, wherein the plurality of queries of interest comprise a plurality of theoretically possible queries of interest pertaining to the plurality of statically composed GraphQL subgraph schemas.

4. The method of claim 3, wherein the plurality of theoretically possible queries of interest pertaining to the plurality of statically composed GraphQL subgraph schemas comprise all theoretically possible queries pertaining to the statically composed GraphQL subgraph schemas.

5. The method of claim 1, wherein the validating the one or more identified type conversions further comprises determining whether all fields in the one or more destination types are contained in a set comprising the one or more discovered reachable types.

6. The method of claim 1, further comprising:
generating one or more recommendations with respect to curing a particular graph routing determined to not exist for one or more of the individual queries of the plurality of queries and/or automatically generating a new supergraph schema to cure the particular graph routing determined to not exist for the one or more of the individual queries of the plurality of queries.

7. An apparatus, comprising:
at least one processor coupled to a memory to:
generate a particular supergraph schema based at least in part on a plurality of statically composed GraphQL subgraph schemas; and
determine at build time whether one or more graph routings exist for individual queries of interest of a plurality of queries of interest against the particular supergraph schema, including the at least one processor to:
identify one or more type conversions and/or determine one or more edges in the particular supergraph schema wherein source and destination types are not identical;
validate the one or more identified type conversions between one or more source types and one or more destination types, to include discovery of one or more reachable types from the one or more source types and determination of one or more reachable fields from the one or more source types at least in part via collection of one or more fields associated with the one or more discovered reachable types; and
specify that the particular supergraph schema is valid responsive at least in part to successful validation of the one or more identified type conversions.

8. The apparatus of claim 7, wherein, to generate the particular supergraph schema, the at least one processor to enable a plurality of root query graph routings wherein more than one of the plurality of statically composed GraphQL subgraph schemas include a root query node.

9. The apparatus of claim 7, wherein the plurality of queries of interest to comprise all theoretically possible queries of interest to pertain to the plurality of statically composed GraphQL subgraph schemas.

10. The apparatus of claim 7, wherein, to validate the one or more identified type conversions, the at least one processor is further to determine whether all fields in the one or more destination types are contained in a set comprising the one or more discovered reachable types.

11. The apparatus of claim 7, wherein the at least one processor further to:
generate one or more recommendations with respect to curing a particular graph routing determined to not exist for one or more of the individual queries of the plurality of queries and/or automatically generate a new supergraph schema to cure the particular routing determined to not exist for the one or more of the individual queries of the plurality of queries.

12. An article, comprising: a non-transitory storage medium having stored thereon instructions executable by a computing device comprising a processor coupled to a memory to:
generate a particular supergraph schema based at least in part on a plurality of statically composed GraphQL subgraph schemas; and
determine at build time whether one or more graph routings exist for individual queries of interest of a plurality of queries of interest against the particular supergraph schema, including the at least one processor to:
identify one or more type conversions and/or determine one or more edges in the particular supergraph schema wherein source and destination types are not identical;
validate the one or more identified type conversions between one or more source types and one or more destination types, to include discovery of one or more reachable types from the one or more source types and determination of one or more reachable fields from the one or more source types at least in part via collection of one or more fields associated with the one or more discovered reachable types; and
specify that the particular supergraph schema is valid responsive at least in part to successful validation of the one or more identified type conversions.

* * * * *